(12) United States Patent
Frischmann

(10) Patent No.: US 11,587,190 B1
(45) Date of Patent: Feb. 21, 2023

(54) SYSTEM AND METHOD FOR THE TRACKING AND MANAGEMENT OF SKILLS

(71) Applicant: Ryan M. Frischmann, Rochester, NY (US)

(72) Inventor: Ryan M. Frischmann, Rochester, NY (US)

( * ) Notice: Subject to any disclaimer, the term of this patent is extended or adjusted under 35 U.S.C. 154(b) by 1435 days.

(21) Appl. No.: 15/638,695

(22) Filed: Jun. 30, 2017

Related U.S. Application Data

(60) Provisional application No. 62/378,069, filed on Aug. 22, 2016, provisional application No. 62/374,587, filed on Aug. 12, 2016.

(51) Int. Cl.
*G06Q 50/20* (2012.01)
*G09B 5/06* (2006.01)
*G09B 7/06* (2006.01)
*G09B 5/12* (2006.01)
*A63F 13/85* (2014.01)
*H04L 67/10* (2022.01)
*G06Q 10/0631* (2023.01)

(52) U.S. Cl.
CPC ........... *G06Q 50/205* (2013.01); *A63F 13/85* (2014.09); *G09B 5/065* (2013.01); *G09B 5/12* (2013.01); *G09B 7/06* (2013.01); *G06Q 10/063112* (2013.01); *H04L 67/10* (2013.01)

(58) Field of Classification Search
CPC .................................................. G06Q 50/205
USPC ......................................................... 434/365
See application file for complete search history.

(56) References Cited

U.S. PATENT DOCUMENTS

| | | | |
|---|---|---|---|
| 2,862,309 | A | 12/1958 | Von Der Hellen |
| 3,885,326 | A | 5/1975 | Robinson et al. |
| 4,778,153 | A | 10/1988 | Bachman et al. |
| 5,271,642 | A | 12/1993 | Jahier et al. |
| 5,528,363 | A | 6/1996 | Fachinger et al. |
| 5,660,548 | A | 8/1997 | Ellenbogen |
| 5,709,918 | A | 1/1998 | Kimijima et al. |
| 6,080,937 | A | 6/2000 | Korthauer et al. |
| 6,706,314 | B2 | 3/2004 | Butland |
| 7,414,531 | B2 | 8/2008 | Davies |
| 7,490,765 | B2 | 2/2009 | Ishii et al. |
| 7,680,729 | B2 | 3/2010 | Thornton |
| 7,756,753 | B1 | 7/2010 | McFarland |
| 8,025,314 | B2 | 9/2011 | Adler |
| 8,336,917 | B2 | 12/2012 | Doiron |
| 8,352,744 | B2 | 1/2013 | Kruse |
| 8,744,855 | B1 | 6/2014 | Rausch |
| 9,051,072 | B2 | 6/2015 | Eder et al. |
| 9,251,130 | B1 | 2/2016 | Lynnes et al. |
| 9,355,569 | B2 | 5/2016 | Robertson et al. |

(Continued)

FOREIGN PATENT DOCUMENTS

KR 20070014216 1/2007

OTHER PUBLICATIONS

English Abstract of Pending Chinese Patent Application No. 201610599496, filed Jul. 27, 2016.

*Primary Examiner* — Kesha Frisby
(74) *Attorney, Agent, or Firm* — Duane C. Basch; Basch & Nickerson LLP

(57) ABSTRACT

A system and method for creating a standardized format for the display of skills information, and more particularly a format suitable to represent what is learned from any discrete task, resource, experience, project, or activity.

18 Claims, 22 Drawing Sheets

(56) References Cited

U.S. PATENT DOCUMENTS

| | | |
|---|---|---|
| 2002/0023086 A1 | 2/2002 | Ponzio, Jr. |
| 2002/0161765 A1 | 10/2002 | Kundrot et al. |
| 2003/0170596 A1 | 9/2003 | Blank |
| 2004/0007868 A1 | 1/2004 | Werling |
| 2004/0117126 A1 | 6/2004 | Fetterman et al. |
| 2005/0026131 A1* | 2/2005 | Elzinga .................... G09B 5/00 434/365 |
| 2005/0055281 A1 | 3/2005 | Williams |
| 2005/0073104 A1 | 4/2005 | Toubkin |
| 2005/0170325 A1 | 8/2005 | Steinberg et al. |
| 2006/0048092 A1 | 3/2006 | Kirkley, Jr. et al. |
| 2006/0166173 A1 | 7/2006 | Ellis et al. |
| 2006/0282399 A1 | 12/2006 | Ackermann et al. |
| 2007/0179820 A1 | 8/2007 | Gaster |
| 2008/0108029 A1 | 5/2008 | Luke et al. |
| 2010/0045816 A1 | 2/2010 | Rhoads |
| 2010/0221443 A1 | 9/2010 | Kimura et al. |
| 2011/0104424 A1 | 5/2011 | Garland |
| 2011/0125796 A1 | 5/2011 | Singh |
| 2011/0167342 A1 | 7/2011 | de la Pena et al. |
| 2011/0202481 A1 | 8/2011 | Lang et al. |
| 2012/0209670 A1 | 8/2012 | Zealer |
| 2012/0232971 A1 | 9/2012 | Pabst et al. |
| 2013/0020387 A1 | 1/2013 | Montague |
| 2013/0177894 A1 | 7/2013 | Fotenos et al. |
| 2013/0236877 A1 | 9/2013 | Zhou et al. |
| 2013/0332593 A1 | 12/2013 | Patnaikuni et al. |
| 2014/0186817 A1 | 7/2014 | Wang et al. |
| 2014/0188746 A1 | 7/2014 | Li |
| 2014/0297035 A1 | 10/2014 | Bers et al. |
| 2016/0148524 A1* | 5/2016 | Pulido ...................... G09B 5/02 434/353 |
| 2016/0242979 A1 | 8/2016 | Gorgen et al. |

\* cited by examiner

SYSTEM AND METHOD FOR THE TRACKING AND MANAGEMENT OF SKILLS

This application claims priority under 35 U.S.C. § 119(e) from U.S. Provisional Patent Application No. 62/374,587 for "PROCESS/METHOD TO CREATE A STANDARDIZED DISPLAY, CATALOG, AND DATABASE FOR WHAT IS LEARNED FROM CONSUMING AN EDUCATION RESOURCE . . . " by Ryan M. Frischmann, filed Aug. 12, 2016, and from U.S. Provisional Patent Application No. 62/378,069 for "STANDARDIZED DISPLAY OF LEARNING AND KNOWLEDGE GAINED FROM A RESOURCE OR EXPERIENCE . . . " by Ryan M. Frischmann, filed Aug. 22, 2016, both of which are hereby incorporated by reference in their entirety.

Disclosed herein is a system and method for creating a standardized format for the display of skills information, and more particularly a format suitable to represent what is learned from any discrete task, resource, experience, project, or activity. The method further involves: defining what is learned, designating a credential gained after "consuming" the resource, verifying learning expectations and outcomes are accurate, and creating awareness and access to the resource within or to a market.

BACKGROUND AND SUMMARY

There is no current standardized process or common display format for a provider to represent or illustrate what has been learned from a user's "consumption" of an educational resource, or for a user to easily make a comparison of educational resources against one another. In other words, users or consumers of educational resources are generally unable to compare and contrast one resource with another without studying or reviewing detailed information about the resource. Indeed, some educational resources even fail to provide such information in advance. Thus, potential users (students, trainees, etc.) are often left with options such as buying or using the resource on a trial basis, relying on subjective reviews by prior users, and other non-quantitative and inconsistent evaluation methods and mechanisms.

Without a standard and common display format, there is no way of comparing or contrasting traditional educational resources in the form of books and classroom courses, with emerging educational resources such as online games and courses, Internet-of-Things (IoT) experiences, etc. That is to say there is no way to compare and contrast what one might gather from a book on a particular subject versus what might be gained by completing an on-line course on the same subject. This disarray becomes even more apparent when one seeks to compare amongst different forms or types of education, skills development, higher education, and professional learning resources.

Some standards (e.g., common core) and accreditation (e.g., college and university undergraduate and graduate programs) are being applied in the marketplace, but there is nothing that collectively allows varied educational and learning resources to be processed together in a logical sequence to produce a result depicting what is gained or learned by "consuming" the educational resource—a standardized learning display or format. There is believed to be significant value in establishing a consistent approach for analyzing an educational resource and representation of learning from the resource, as it provides a basis for comparisons and is useful in all learning stages.

Companies create games with clear learning objectives; for example, Sim City™ creates a game that can assist with the learning and practice of Common Core standards. But, the game creator does not provide a standardized representation of learning or experience that can be gained by using the game, something it can display in association with the website or mobile application, to market the game based upon the skills developed or learning that takes place as a result of using the game.

Some companies offer applications to acquire credentials and then stack them. Mozilla built one such platform with learning badges and a backpack to port them to other applications. However, this is limited as it focuses solely on validating learning. Badgeville has also created a similar platform with badges and other game-like mechanics. While effective, the platform is proprietary and represents learning in its own prescribed way. The embodiments disclosed herein are meant to create a representation of skills and learning from any resource, and to facilitate the contrasting and comparison of educational resources that are of a different type.

With the disclosed embodiments, teachers and other resource providers have a step-by-step process to define learning expectations of their resource, regardless of the type of resource or the intended audience. The standardized display format and credentials may be accessed from a URL found from an online search engine, or embedded on a web page or mobile application. The label-like format also has a print layout, which can be printed on educational resources found in a typical retail environment or store.

In order to illustrate the advantages provided by the disclosed systems and methods, consider a parent at a store comparing skills labels (aka education or learning label) presented on different educational resources. Similar in nature to food labelling, the skills labels on each resource are presented in a common format that facilitates quick review and easy comparison. The parent can then choosing a resource based on: cost or return on investment (ROI), how much time the resources takes to consume, learning preferences (e.g., type: book or game), or credentials earned upon completion. All of this information, and more, is depicted clearly and concisely by using the common format of the labels.

Disclosed in embodiments herein is a system operating in association with a computer network, for the creation and display of a skill label representing a standardized display of skills acquired as the result of a user's consumption of an educational resource, comprising: one or more processors suitable for executing programmable code and accessing memory operatively connected thereto, said processors and memory forming at least part of the computing network; an educational resource data repository in the form of memory containing a plurality of records, one for each educational resource, each record including: a unique identifier for each resource, a link between each identifier and at least one resource, and data fields containing information related to the resource; a user data repository wherein personally identifiable information may be stored in a user record associated with each user, the user record further including information indicating the educational resources that the user has acquired; a common label format, referred to as a skills label, providing for the representation of at least one skill associated with each educational resource, said skills label representing at least a portion of the information stored in the educational resource data repository for the associated educational resource; a label output engine for producing a graphic file, said graphic file, upon rendering by a suitable output device, providing a visual representation of the skills label information, wherein the visual representation of skills labels for different resources contain common elements; and at least one user interface, operating under the programmatic control of a software application capable of interacting with at least one of said educational resource data repository or said user data repository, for creating and editing an educational resource record or a user record, respectively.

Further disclosed in embodiments herein is a method, operating in association with a computer network and one or more processors suitable for executing programmable code and accessing memory operatively connected thereto, said processors and memory forming at least part of the computing network, for the creation and standardized display of skills associated with a user's consumption of an educational resource, comprising: populating an educational resource data repository, in the form of memory containing a plurality of records, one for each educational resource, each record including: a unique identifier for each resource, a link between each identifier and at least one resource, and data fields containing information related to the resource; creating a user data repository wherein personally identifiable information for each user is stored in a user record associated with the user, the user record further including information indicating the educational resources that the user has acquired; providing for the representation of at least one skill associated with each educational resource using a common label format, referred to as a skills label, said skills label representing at least a portion of the information stored in the educational resource data repository for the associated educational resource; producing a graphic file via a label output engine, said graphic file, upon rendering by a suitable output device, providing a visual representation of the skills label information, wherein the visual representation of skills labels for different resources contain common elements; and interacting with at least one of said educational resource data repository or said user data repository, via at least one user interface operating under the programmatic control of a software application, and creating and editing an educational resource record or a user record, respectively.

Also disclosed herein is a computer program product embodied on a computer readable storage medium for processing educational resource information stored on a network comprising: computer code for receiving from a first source a first network educational resource record; computer code for correlating and validating the first network educational resource record with standards and validation information available from a common source; and computer code for using the educational resource information with which the first network accounting record is correlated and validated to enhance the first educational resource record and to produce a first skills label associated with the educational resource, where said first skills label includes a displayable representation of at least a portion of information in the enhanced first educational record.

BRIEF DESCRIPTION OF THE DRAWINGS

FIG. 10 is an illustrative example of a display window for user entry of label header information in accordance with an aspect of the disclosed embodiments;

FIG. 11 is an illustrative example of a display window for user entry of resource information in accordance with an aspect of the disclosed embodiments;

FIG. 15 an exemplary display of an interface by which a "standard" may be entered in accordance with an aspect of the disclosed embodiments;

Figure 1:
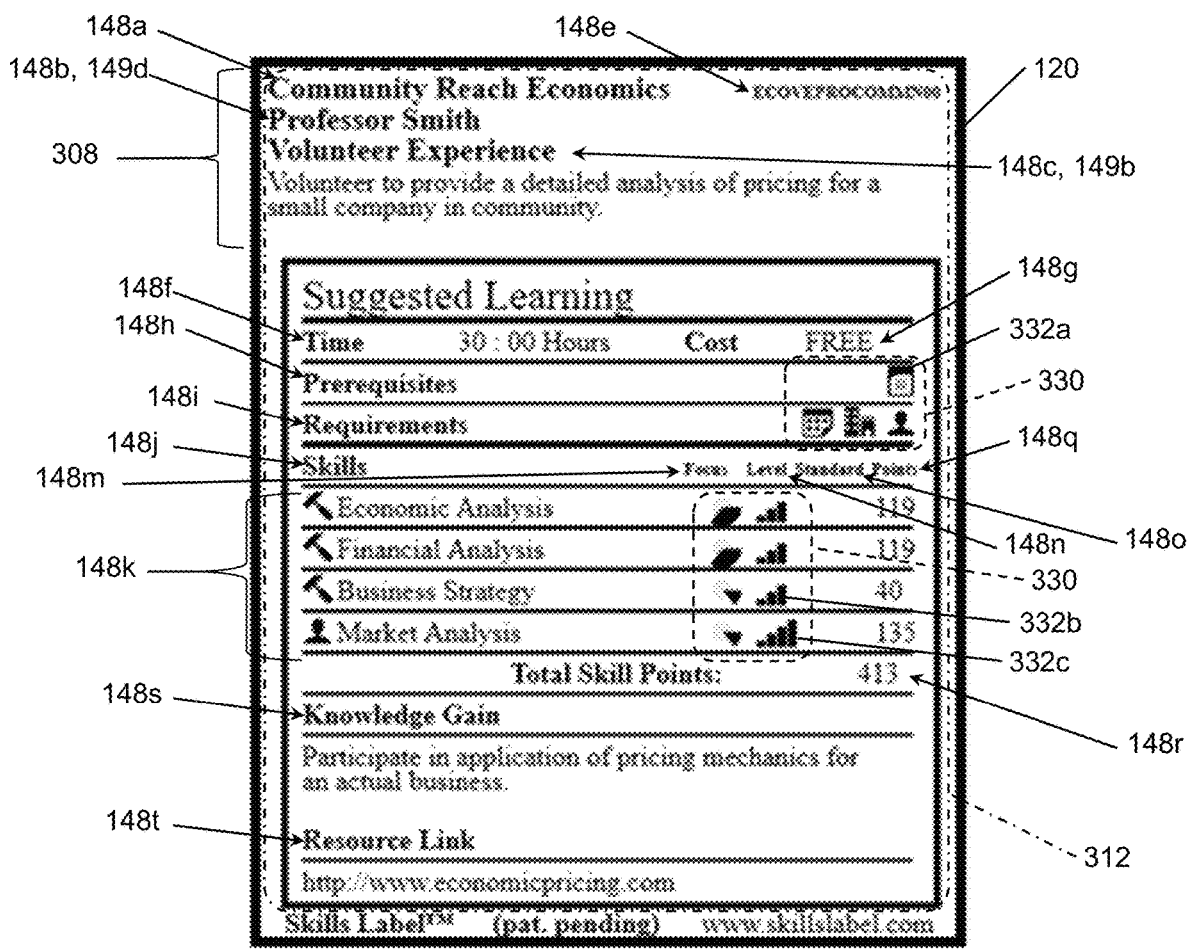
FIG. 1 is a standardized representation of skills in the form of a skills label in accordance with the disclosed embodiments.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

The following terms have been employed in the description, and in addition to conventional meanings the terms are further defined as stated:

Credential—an indicator, which may be in the form of a graphic (e.g., badge), signifying that a Learner has successfully consumed or completed an Educational Resource;

Discrete Tasks—consuming a resource such as reading a book, playing a game, completing a project, etc.;

Educational Resource (or Resource)—resource from which a skill, experience or expertise is derived, including books, games (e.g., vide, online), websites, online learning, massive open online courses (MOOCs), activities, activities where users gain knowledge, virtual reality, gamification, internet of things (IoT) requirements (e.g., devices, virtual reality equipment, etc.), experience, etc.;

Learner—a person consuming an education resource, for example, a student or professional;

Provider—an individual, organization, business etc. that creates or otherwise provides access to an Educational Resource(s);

Provider Platform—an interactive interface to create, edit, administer an educational resource or information relating to the educational resource, including the skill label(s) associated with the educational resource;

QR Codes—a standardized code to provide an index in the form of a link or information, the QR Code can be published online or on printed materials, and various smartphone apps scan QR Codes in order to obtain information or at least access to such information;

Learning Badge—a term used to describe a "graphic" or similarly visible representation of achievement, Learning Badges may be received by a Learner after consuming an Educational Resource;

Search Engine—similar to the conventional meaning, the use of this term may be specific to Educational Resources with the search itself being directed to or limited to those characteristics or information that are included in educational resources, and which are based on data collected from, for example, a Provider when creating or editing the Educational Resource on a Provider Platform;

Skill Label—a standardized or common-format visual or graphic representation of a collection of information about a particular educational resource, the data residing within a database(s) or data repository(ies) storing all information about the resource(s);

Skill Set—a collection of skills (e.g., transferrable, technical, soft skills, and behaviors) that are assigned as a representation of a learning expectation for a resource;

Skill Focus Value—one or more values intended to provide a quantitative representation of the level of attention put on learning a skill (e.g., a ranking from 1 to 10); in one illustrative embodiment, a Skill Focus Value may be chosen or specified by the Provider, or in an alternative embodiment the value(s) may be determined or calculated based using measures of both frequency and intensity of the underlying methods for the skill has to be applied;

Skill Level of Difficulty—this characteristic is intended as a representation of the skill level required to consume the Educational Resource (e.g., a ranking of 1 to 5); in one embodiment the Skill Level of Difficulty may be specified as part of the creation of the Educational Resource or by a Provider (e.g., teacher), and in alternative embodiments the Skill Level of Difficulty may be calculated by averaging or aggregating the level of difficulty of each of one or more underlying methods used or learned as part of the Educational Resource;

Skill Points—is a unique representation or characterization intended to allow a Learner or others to quickly compare or contrast one Educational Resource with another. Analogous to say the listing of an "percent daily value" or "calories per serving" for a food label, the Skill Points for an Educational Resource are determined or calculated based on Skill Focus Values, time, and level of difficulty associated with the Educational Resource;

Skill Category(ies)—is intended to represent one or more groups or types of skills associated with an Educational Resource and may be used to identify delineation between Educational Resource by differences in the Skill Categories that are reflected in the resource; in one embodiment (e.g., FIG. 1), pictorial or graphic icons may be used for visual differentiation between Educational Resources with one or more prominent Skill Categories being used for the resource;

Teacher—a person responsible for creating, editing or providing an Educational Resource, or a Skills Label associated therewith, where the teacher may be an example or part of an organizational Provider; other examples of Teachers may include a game creator, author, teacher, professor, etc.;

User—the consumer of an Educational Resource, conventionally and equivalently referred to as students, professionals, etc. that consume Educational Resources; and User Platform—an interface (app, website, etc.) that a User may employ to interact with to investigate, acquire, review Educational Resources; may include a Search Engine to identify skills labels based on specific criteria input by the User.

Figure 2:
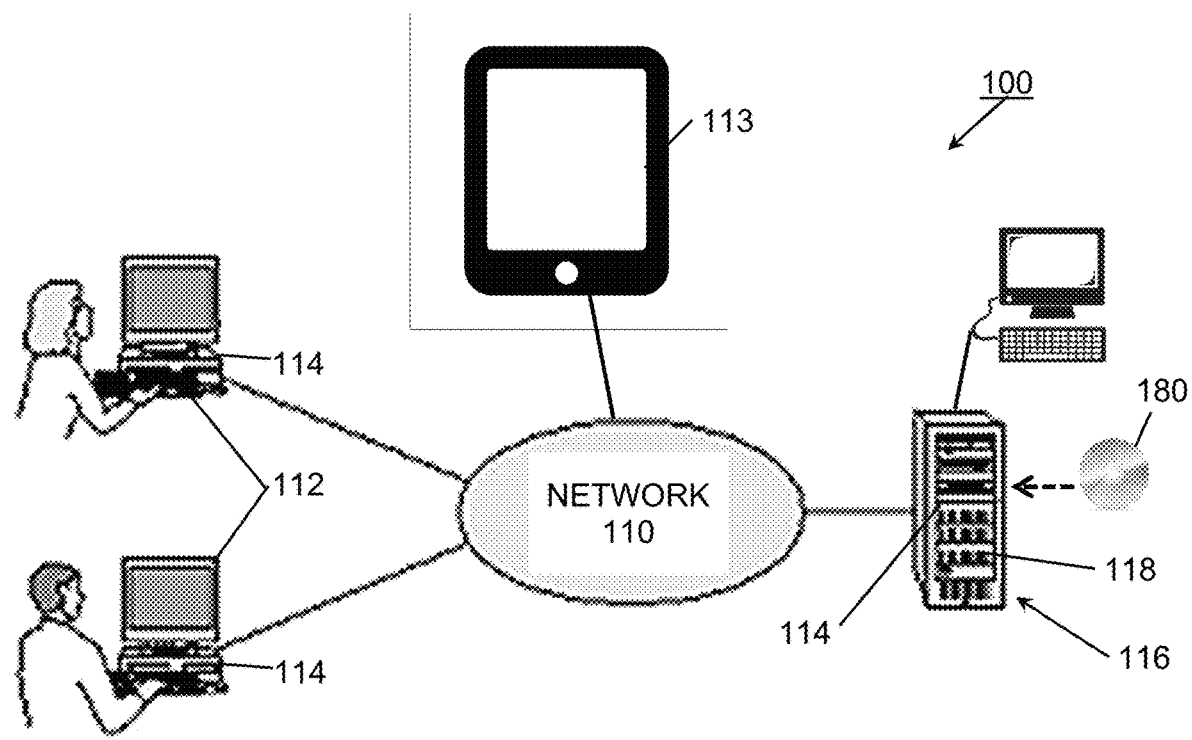
FIGS. 2 and 3 are illustrations of exemplary embodiments for the disclosed system and methods.
Figure 3:
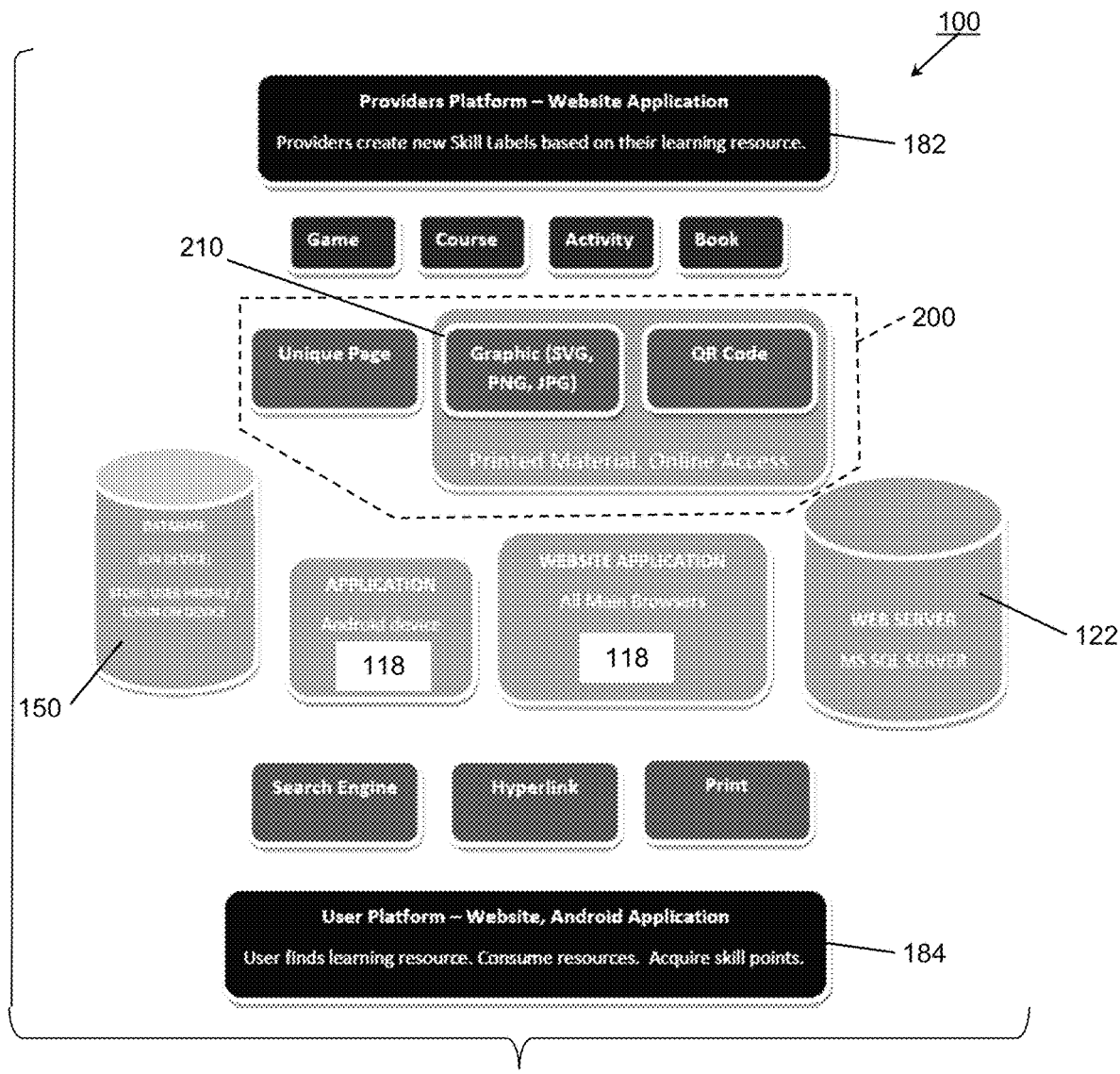

Disclosed in the following embodiments that are discussed in detail are a system and method operating in association with a computer network, for the creation and display of a skill label (e.g., FIG. 1, 120) representing a standardized display of skills acquired as the result of a user's consumption of an educational resource 320 (e.g., performance one or more discrete tasks). Turning next to FIGS. 2 and 3, for example, the disclosed embodiment(s) may be carried out on a system 100 operatively associated with a computer network 110. While various configurations may be employed for such a system, in one embodiment the network is a client-server system (FIG. 2), where a single or multiple servers 116, each including a processor 114, are programmed to interact with various client computers or workstations 112 as is well-known in the computer and information technology industry.

FIG. 3 is an exemplary representation of a functional diagram that may be employed to carry out one or more aspects of the disclosed system and associated methods or operations. And, the diagram of FIG. 2 includes a provider platform 182, through which providers are able to interact with the system to create and edit educational resource records and associated skills labels. Also included is a user platform 184, which may be an on-line server-based website and/or an application (e.g., Android) that permits and enables a user interacting with system 100, wherein the user can search and find educational resources, and associated skills labels, as well as consume the educational resources and acquire or accumulate skills points and associated credentials. Furthermore, aspects and features of the embodiments disclosed herein may be implemented as or via a computer program product embodied on a computer readable storage medium 180. For example, the computer program product may be installed in memory 118 as an application and used for processing educational resource information stored on the network 110. Referring to FIG. 2, depicted therein is an exemplary computer network 110 having a plurality of workstations 112, where the network includes at least one server including processors 114 and memory 118, and particularly including programmatic memory, within memory 118 or otherwise operatively accessible by server 116 or another processor 114 suitable for the storage and operation of a computer program product embodied on a computer readable storage medium 180.

The embodiment represented in FIGS. 2 and 3 would include computer code for receiving from a first source, for example a client workstation where a provider has logged in, a first network educational resource record. Although the following description includes a description of the information that would be entered into the record by a provider, it is also possible to prepare such information in advance and upload it via a CSV-formatted file or other medium. The system, or more particularly the service, includes and operates computer code for correlating and validating the educational resource record(s) on the network, for example in repository 122, with standards and validation information available from a common source. Also included is computer code for using the educational resource information with which an educational resource record in repository 122 is correlated and validated to enhance the first educational resource record and to produce a first skills label (e.g., 120) associated with the educational resource, where the skills label 120 includes a displayable representation of at least a portion of information in the educational record.

The computer program operating on the system 100 also includes an interactive interface such as on workstations 112 or a portable or handheld device 113 (e.g., a tablet, smartphone or the like) for a provider to add or edit the educational resource record information stored on the system 100, particularly where the educational resource record is stored within a data repository 122.

Accordingly, the system may include one or more processors 114 suitable for executing programmable code and accessing memory 118 operatively connected thereto; the processors and memory forming at least part of the computing network 110. Also included in the system is an educational resource data repository 122 (database(s)) in the form of memory 126 containing a plurality of records 132, one for each educational resource. Each record includes a unique identifier 136 for each resource 122, a link 140 between each identifier and at least one resource, and data fields 144 containing information related to the resource. A user data repository 150 wherein personally identifiable information may be stored in a user record 154 associated with each user, the user record further including information indicating the educational resources that the user has acquired.

Each skills label includes information 312 selected from the group consisting of: a subject matter code, resource code, sequence code, provider/author code, title, requirements; a common label format, referred to as a skills label, providing for the representation of at least one skill associated with each educational resource, said skills label representing at least a portion of the information stored in the educational resource data repository 122 for the associated educational resource. System 100 also includes a label output engine 200 for producing a graphic file 210 (e.g., SVG 121), said graphic file, upon rendering by a suitable output device, such as a portable computing device 113 (e.g., smartphone, tablet, laptop, etc.). The output device providing a visual representation 120 of the skills label information, wherein the visual representation of skills labels for different resources contain common elements; and the rendering apparatus taking the form of a portable computing device 113 (e.g., smartphone, tablet, laptop, etc.). System 100 may further include at least one user interface 170, operating under the programmatic control of a software application 174 capable of interacting with at least one of said educational resource data repository 122 or said user data repository 150, for creating and editing an educational resource record 132 or a user record 154, respectively.

The system and method as described contemplates the skills label 120 being automatically created by the one or more processors 114 by transforming information stored in the education resource data repository 122 into one or more graphical representations of the information. Also, the label output engine 200 may further include a scannable code (e.g., barcode, QR code, etc.) in the graphic file that provides the visual representation of the skills label information, such a code providing coded information that may be used to provide additional information relating to the skills label, including a URL or similar link.

In one embodiment the computer code may be referred to as a Skills Label application, and is constructed as a functioning website and a native Android app for client access. Constructing the application as libraries provides for easily updating and manipulating the code to permit revisions and added functionality. As noted above, a repository 122 is in the form of a database residing on the web server 116, where the database stores the educational resource records associated with the skills database, and user data repository 150 includes provider and user account profiles, skill assignment information, personal information and account information. In one embodiment the Skills Label application complements a skills-based methodology as disclosed and described in the book "A Skills-Based Approach to Developing a Career", by R. Frischman, ©2013, which is hereby incorporated by reference in its entirety. Learners constantly cycle through four stages as they move through educational and employment experiences. One of the overarching themes is users can and should have personalized and adaptive learning to acquire skills throughout their lifetime. Skills-based approach becomes a solution to the problem of finding acceptable and alternative learning resources. Moreover, in the SkillsLabel app and website, there is a Skill Points component, and user may accumulate points by consuming a learning or educational resource(s).

Figure 4:
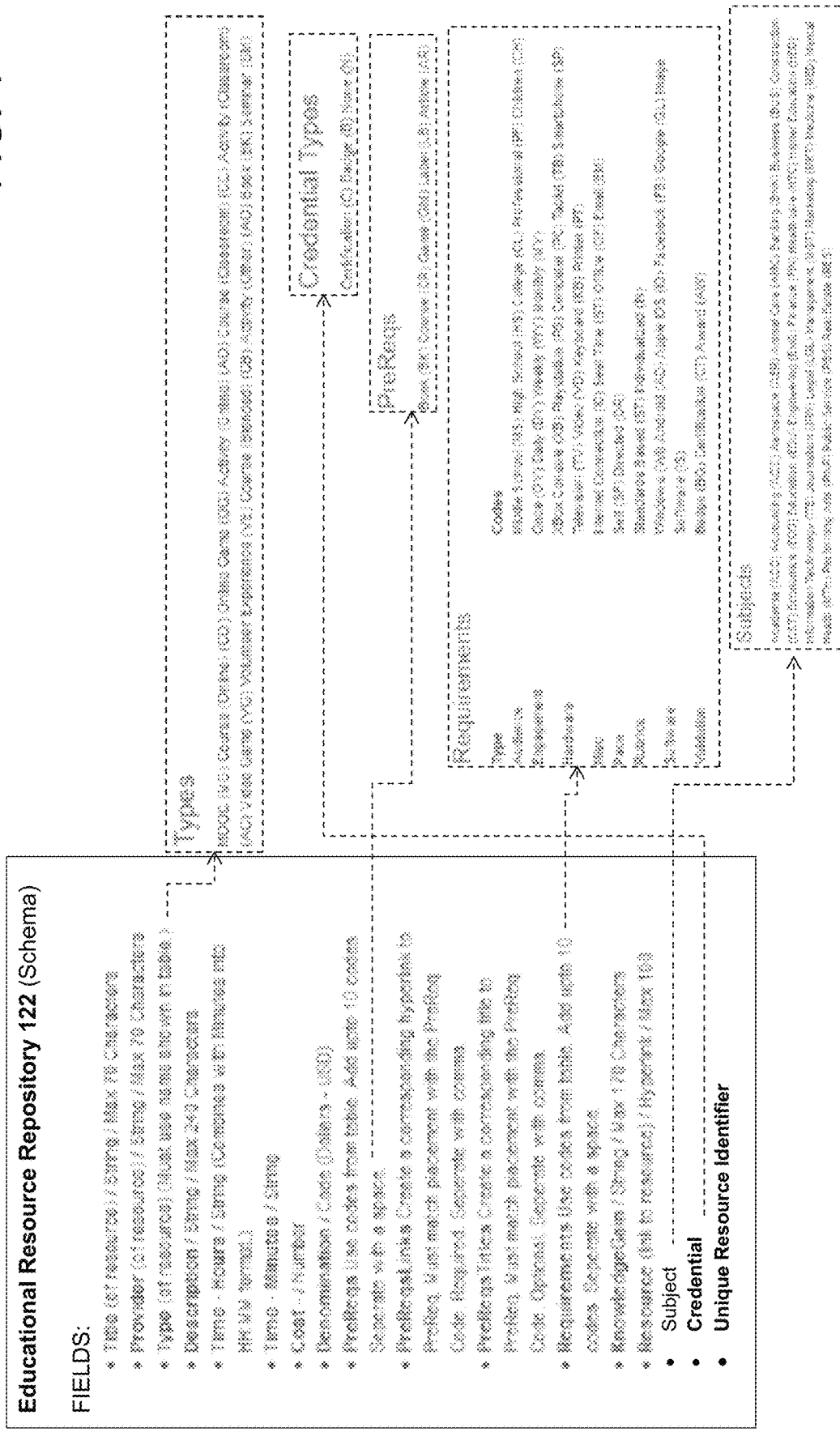
FIG. 4 is a representation of an exemplary education resource database schema.

As represented in FIG. 4, depicting an exemplary education resource database schema, the system and method described contemplate the information stored in the educational resource data repository, and rendered by the suitable output device, including a plurality of data fields in the records 132. The data fields 144 may include: resource title 148*a*, resource provider 148*b*, resource type 148*c*, resource description 148*d*, unique identifier 148*e*, completion time 148*f*, resource cost 148*g*, prerequisites 148*h*, requirements 148*i*, skill(s) type 148*j*, skill(s) 148*k*, focus 148*m*, level 148*n*, standard 148*o*, skill(s) difficulty 148*p*, skill points level for each skill 148*q*, total points for the resource 148*r*, knowledge gained 148*s*, and a resource URL 148*t*.

As noted above, the skills label includes at least one graphical representation for at least one data field selected from the group consisting of: prerequisites, requirements, skills, focus, and level. The graphical representation may be in the form of an icon or similar user-discernable representation so that a viewer of the skills label is quickly able to understand the relevance of the data field. For example, referring to FIG. 1, depicted therein is an exemplary label 120 for Professor Smith's Community Reach Economics resource. And, in regions 330, there are icons 332 of various shapes that are intended to present information in a pictorial manner. For example, under the "Level" column in the skills field, a bar graph icon (332*b*, 332*c*) is employed to characterize the relative level for each of the enumerated skills. As illustrated in FIG. 1, the educational resource repository or database will include information such that competency bars 332*b* can be displayed for each skill—thereby providing an easy visual indication of the competency that would be achieved by consuming the associated resource.

Figure 5:
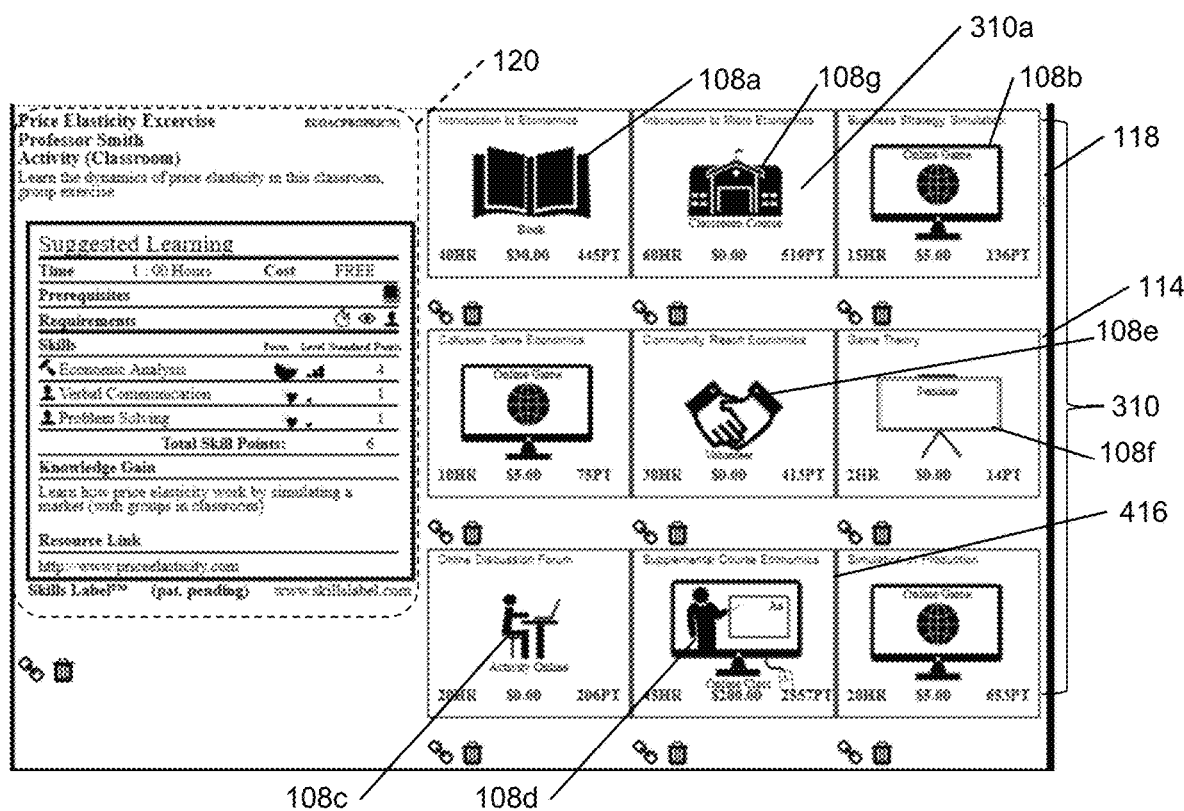
FIG. 5 is an exemplary illustration of dashboard search results along with an associated skills label for one resource.

Referring to FIG. 5, as depicted in the dashboard search results, the system and method may include various forms of educational resources. In one embodiment, the resources contemplated include and may be selected from the group consisting of: books (icon 108*a*), games (icon 108*b*), websites (icon 108*c*), online learning (icon 108*d*), and activities (icon 108e), seminar (108f), classroom course (108g) as well as other activities where users gain knowledge or experience. And, as shown in the skills label 120, for example FIG. 5, each label includes a representation of information selected from the group consisting of: a subject matter code 149a (ECO for Economics), resource code 149b (e.g., VE or Volunteer Experience), sequence code, provider/author code 149d, title 148a, requirements 148i, etc.

The system and method described herein further include a process, for example a process operating under the programmatic control of a software application, for interacting with at least one educational resource data repository or user data repository such as the repository 122, for at least semi-automatically providing for the review and validation of an educational resource and the generation of the associated skills label. As will be appreciated the educational resource repository 122 includes a plurality or records, each representing a single educational resource. Moreover each record may include one or more fields such as Title, Provider, Type (e.g., books, games, websites, online learning, and activities, seminar, classroom course), etc. with information characterizing the resource. As indicated in the exemplary schema of FIG. 4, each field in the educational resource repository also has a defined format to permit or force consistency amongst records.

Credentials

As will be appreciated, upon consuming an educational resource a learner (user) may also be granted or assigned a credential earned after consuming the resource. Credentials provide an indication of consuming or completing an education resource and may be one of the following types: badge, award, certification, license, as well as other alternatives. Also contemplated as part of the disclosed system and method is a credential retrieval function whereby the system derives a link (e.g., a URL) after a Skills Label is created and the credential is assigned to or associated with the skills label. Upon consumption of the resource, the user gets a link to download the credential and/or store the credential, or a link thereto, in the user's record in the user data repository.

In a general sense, the provider creates a skills label, and as part of doing so they may assign a credential by selecting one from a catalog of graphics and adding overlaying text. Some of the type of credentials graphics that may be selected by the Provider include: badges, certifications, licenses, etc. Considering an example, in online course context, the educational resource or course is represented on a Skills Label, which also includes a certification after completion. The instructor or professor gives students a link to the certification after they have completed the course. Students can later click the link and download the certification for storage or association with their user record. In one embodiment, the credential acts as a certification (and verified completion of consuming it) and may be stored for the student in a "My Collection" of Skills Labels.

Referring to FIG. 5, depicted therein is an exemplary representation of how a collection of labels 310 might look as they are returned by a search conducted in an online store. Users see all relevant information (cost, time, and expertise or experience gained) and they may hover over or select a small icon (414, 416, 418) to see relevant information about the resource make a quick return-on-investment (ROI) decision in their head. If interested, users may double-click on an icon and a label 310a for that resource to appear. To make a comparison, users can drag and drop the order of the labels or open the labels to see a side-by-side, line-by-line comparison of the resources using the standard label format as depicted at 310a. As will be appreciated from a review of skills labels in the figures, for example FIGS. 1 and 5, information from a respective skills label is suitable for the user to make a return-on-investment (ROI) calculation using the cost (148g) and total skills points (148r) information and such a calculation could be performed across searched skills labels in order to make comparisons. Other characteristics to compare the search results may include information such as the time anticipated or taken to consume the resource. Skill points become one data point (e.g., a numeric value) representing the active learning of a resource (the return). An interested user could, in the search results, such as depicted in FIG. 5, double click on a skills label icon to see labels, which can then be compared side by side, line by line, etc.

Figure 6:
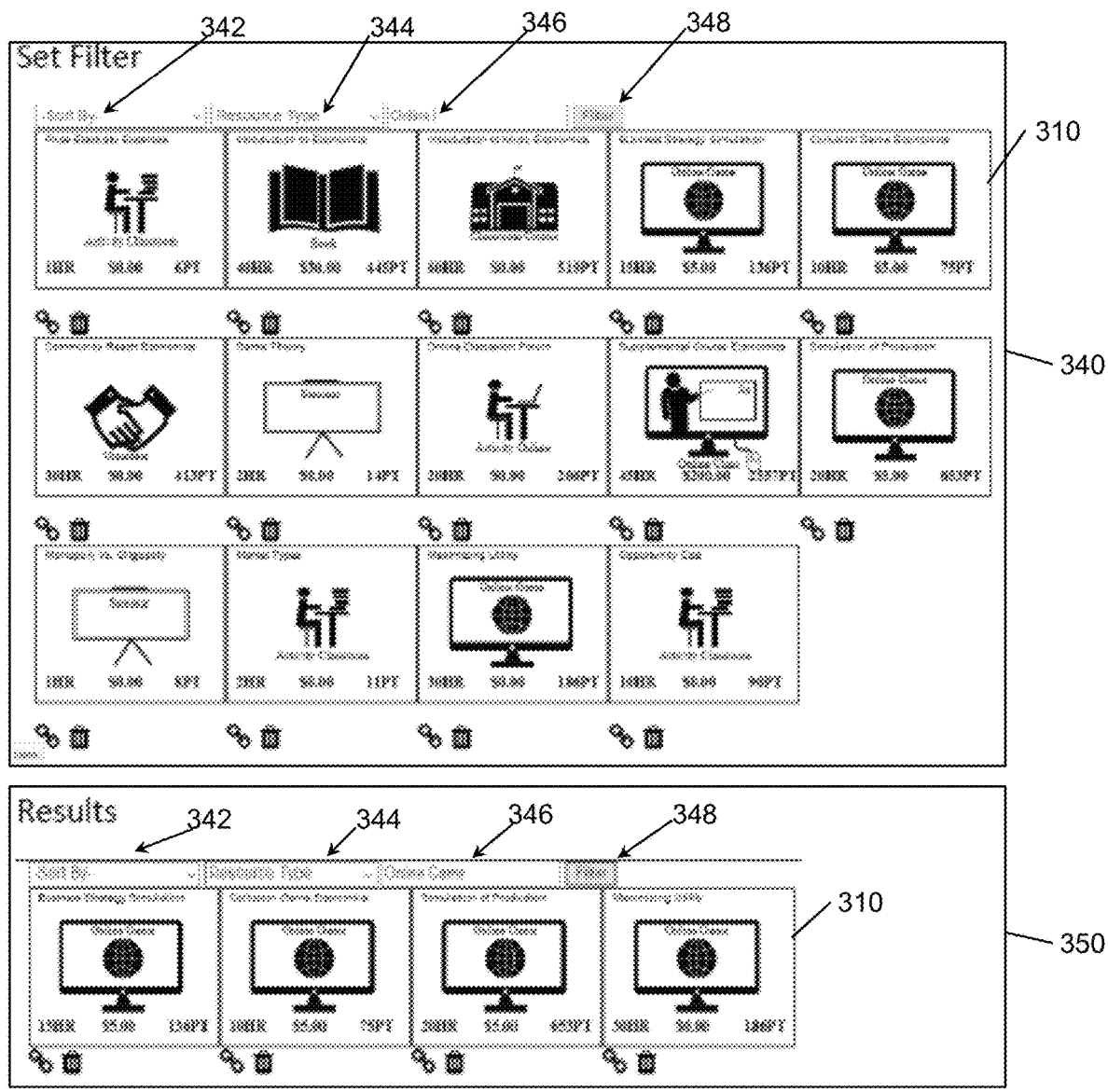
FIG. 6 is a representation of an exemplary display showing a search window with an associated results window.

Referring also to FIG. 6, the disclosed system and method result in the creation of a standardized skills label, that facilitates display, and creation of a catalog for the educational resources. Using the database or repository 122, the system produces a standardized representation for what is learned from an education resource. And, as noted, the system and its associated processes may be implemented as a program(s) carried out in response to computer code. Various types of educational resources can be represented by information stored in repository 122, and stored and ultimately summarized in a skills label using this process. Moreover, the disclosed embodiments differ from what currently exists as there are currently no uniform guidelines or processes for game designers, educational publishers, providers of online learning platform, practitioners of traditional high school and college programs, and other producers or providers of educational experiences to publish the learning expectations of their resources in a consistent, clear, concise way. And in particular, there is no standardized display for educational resources.

As an example of one of the advantages of the disclosed embodiments, consider the search example in FIG. 6. In the example, a user wishing to search for a particular feature or characteristic of an educational resource would employ a search engine. In the example of FIG. 6, a search interface 340 is depicted. In using a filtering process, a series of filter fields are provided along the top of the search interface 340. Included in the fields are a sort field 342, a filter field 344, a filter Term field 346, and a filter button 348. To use the filter function, a user would employ the various fields to narrow the scope of resources/labels to be displayed in the filtered results provided in window or region 350. Referring to region 350, the user's search results are depicted where the user selected "resource type" for field 344 and entered the term "online" into term field 346 in order to display all on-line resources and their associated skills labels in response window 350.

Figure 7:
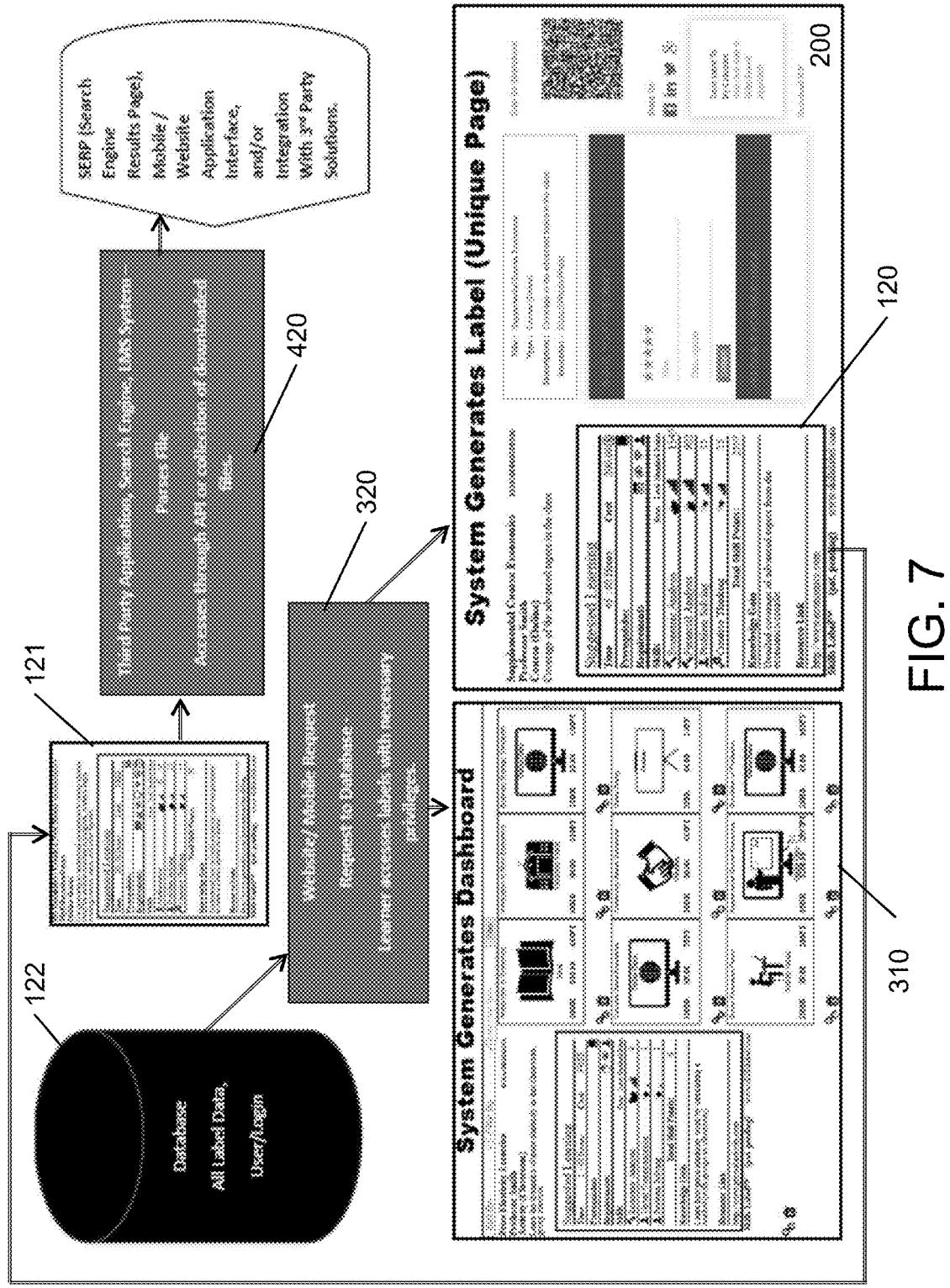
FIG. 7 provides a general representation of a search operation in accordance with one embodiment.

As noted previously, and as represented in FIG. 7, the data on which a search for educational resources or skills labels is performed may be, in one embodiment, an educational resource repository such as a database 122. However, the source of searchable information may also be a collection of one or more skills labels themselves, wherein the information contained in the SVG formatted skills label file 121. As depicted, a search on repository 122, conducted by process 320 may produce a set of educational resources (represented by skills labels) and the set or a portion thereof may be stored in memory and presented on a display using a dashboard 310. And, while it is possible for a third-party application 420 to similarly access a repository 122 to perform its search, it is also contemplated that such an app will be able to directly access a stored skills label(s) and to parse the label to obtain data related to the associated educational resource. Upon doing so, the app 420 could further process, display or search the skills label data.

Furthermore, there is not a verification process for this type of learning, at this level of detail for conventional resources. Accordingly, in one embodiment the disclosed system further includes a process where the outcome or learning that results from the consumption of a resource is reviewed to verify that the outcome or learning is achievable or likely for a user that "consumes" the educational resource. The verification process is intended to assure that expectations are accurately represented for the resource and the associated skills label. Depending upon the embodiment, the validation may be accomplished as a result of a programmatic review executed by the system, or it may be accomplished through a peer review process. This process is shown in a later diagram. As part of the review or validation (verification) process, essentially the frequency and intensity (when and how) of the underlying methods of a skill are applied is tracked by a reviewer and then matched to the learning expectations associated with the educational resource.

This disclosed system and method is a step-by-step process that directs a teacher or provider of educational resources in defining the outcomes or learning for the resource in a common, standardized manner. Every educational resource has associated information that is capable of characterization, storage, and ultimately representation in a standardized display format or Skills Label (e.g., 120).

Referring again to FIG. 1, each Skills Label includes a label header 308 to describe the resource. In the body of a Skills Label, the provider lists all skills, focus levels, standards (if applicable), and a skill level expertise gained from consuming the educational resource. All other learning is captured in a 'knowledge gained' field.

Also referring to FIG. 8A-8E, which collectively provide exemplary views of an interface 170, and the associated process steps or operations by which a provider enters information related to an educational resource, in order for the information to be incorporated into and displayed in a skills label. With regard to entering data into the system, the user is prompted, starting with the entry of the type of resource, as depicted by Step 1 in FIG. 8A, each step (e.g., 1-10) presents the user (e.g., provider) with an interface such as a "wizard" that includes icons or other selectable information with which the provider characterizes the educational resource being added to the repository. The following steps, in order, include: entering resource information to complete a label header, characterizing the educational resource in terms of cost and time, requirements and supports needed to consume the resource, prerequisites for the resource, skills acquired upon successful consumption of the resource, knowledge gained as a result of resource consumption, any credential(s) that is acquired as a result of successful consumption of the resource, setting associated with the educational resource, and a preview of the information entered into the repository and the associated skills label that would be associated with the resource.

The following table is an exemplary listing of some of the information that will be collected in Steps 1-10:

TABLE A

| | Caption | Field | Field Type | Mouse Over | Definition | Section |
|---|---|---|---|---|---|---|
| | 1 | Title of Resource | Text | | Tagline for the resource. Header for the SERP (search engine result page). | Header |
| | 2 | Provider of Resource | Text | | Organizations or people who create education resources OR teacher/professor distributing resource. | Header |
| | 3 | Type of Resource | Text | | Game, traditional course, online course, activity, etc. | Header |
| | 4 | Description of Resource | Text | | Short description. Useful summary. Content that appears on the SERP. | |
| | 5 | Unique Identifier | Text (Auto Generated) | | Automatically created identifier based on the learning resource subject matter and type of media. A classification for storing and retrieving the resource. | Header |
| | 6 | Time to Complete | | | Minutes, hours needed to consume the learning resource. | Label |
| | 7 | Cost of Resource | | | Cost to the user for the resource. | Label |
| | 8 | Prerequisites | Icon Live Link | Text Description, Clickable | Prior experience needed before using the resource. There are 10 slots available. | Label |
| | 9 | Requirements | Icon | Text Descriptions | Accessories support, and settings needed to use the resource. Expressed as an icon. There are 10 slots available. | Label |
| | 10 | Skill Type | Icon | Text Description | A category or type of skill assigned to the resource. This includes technical, transferable, soft, thinking, cultural and other skills, behaviors and values. | Label - Skill Line |

TABLE A-continued

| Caption | Field | Field Type | Mouse Over | Definition | Section |
|---|---|---|---|---|---|
| 11 | Skill | Text | Text Description Skill Context | A skill assigned to the resource. Maximum of 10 skills can be assigned. | Label - Skill Line |
| 12 | Focus | Pie Chart | Percent Focus | How much attention is applied on learning a skill. Expressed as percent of total focus. | Label - Skill Line |
| 13 | Level | Bar Chart | Text Level of Difficulty | 1 to 5 Level of Difficulty in applying the particular skill. | Label - Skill Line |
| 14 | Standard | Icon | Text of Actual Standard | Any standard can be added to Skills Label. | Label - Skill Line |

Considering, as an example, the entry of information in Step 5 for prerequisites, the steps of that operation are presented in the examples of FIGS. 8B-8E, where it can be seen that all prerequisites and requirements (like certain hardware or software) to use the resource are captured using a series of icons that will be represented on the associated skills label. Again, one result of the disclosed system and method steps 1-10 of FIG. 8A is a formatted label, suitable for display, not currently found in the marketplace.

Figure 8A:
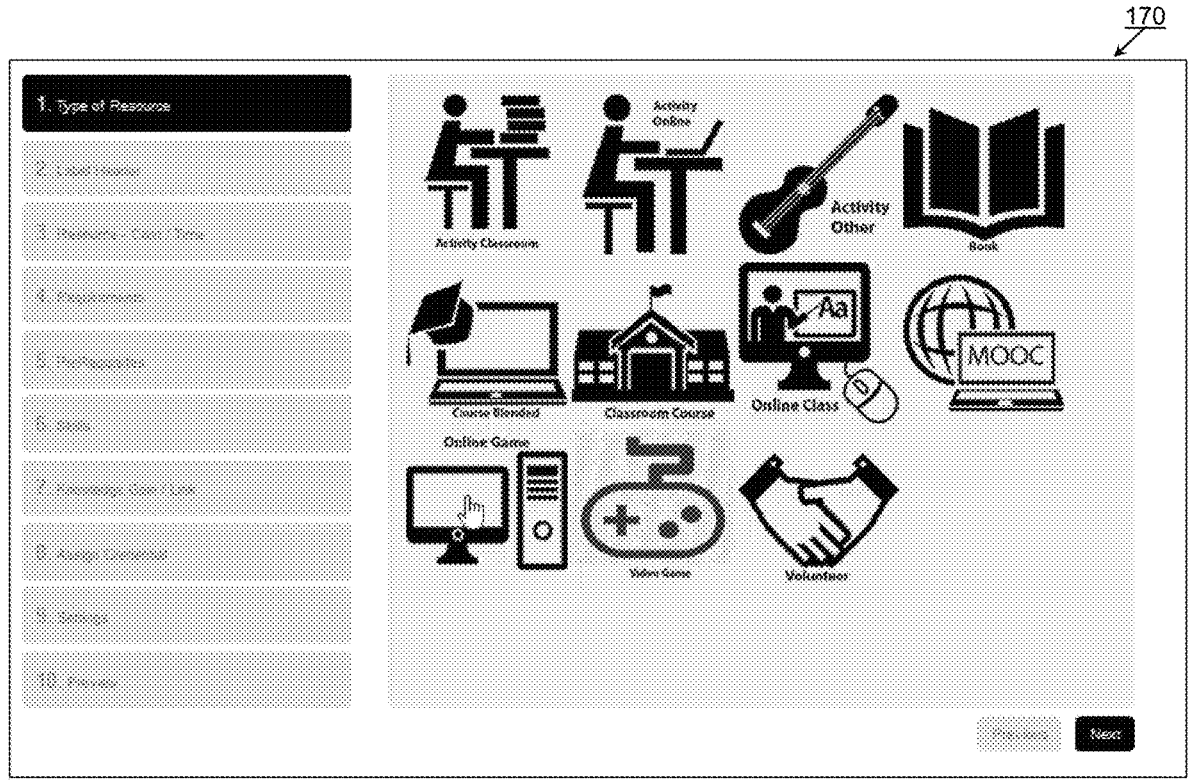
FIGS. 8A-8E are views of an exemplary interface in accordance with the disclosed embodiments.
Figure 8B:
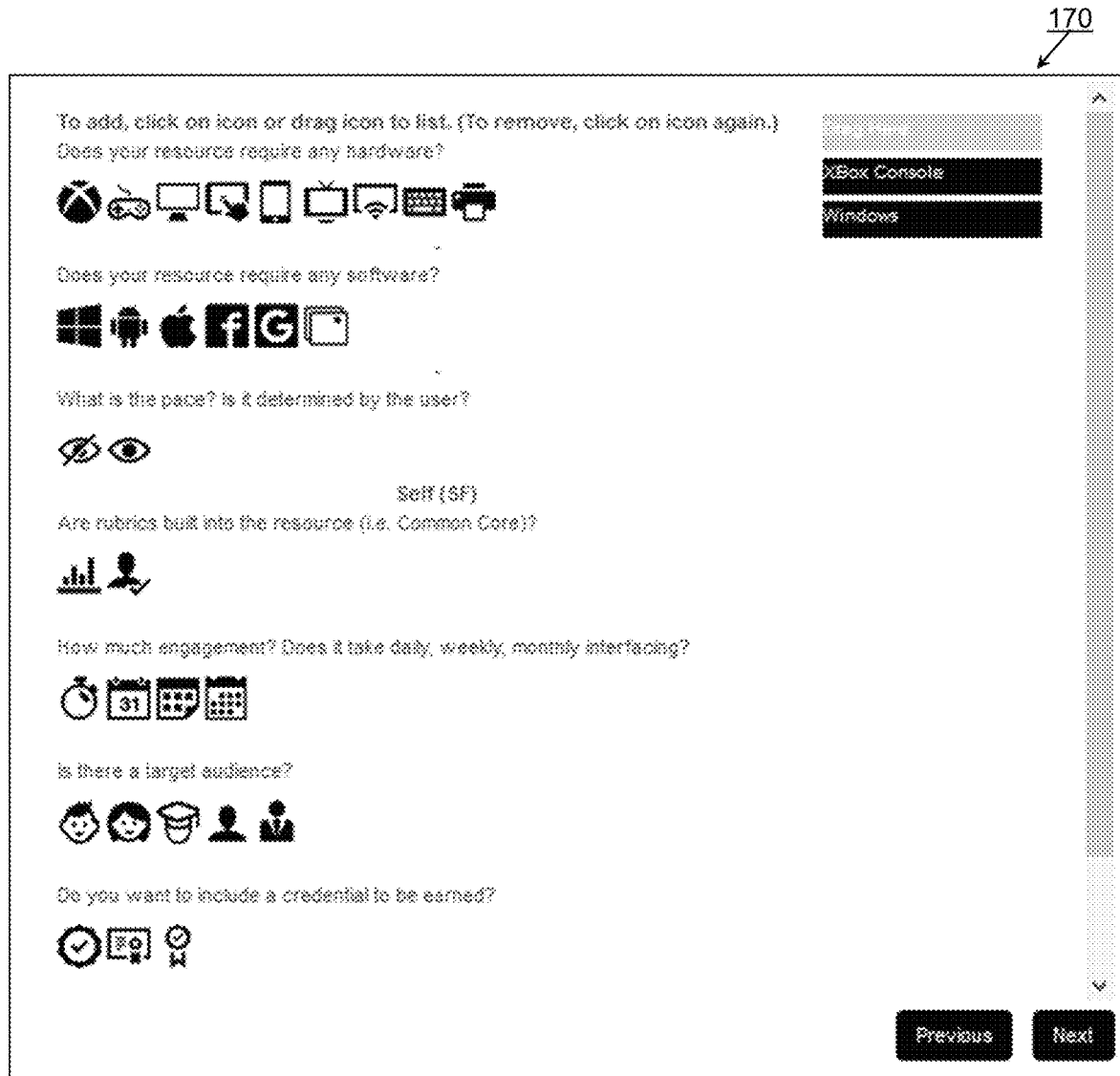
Figure 8C:
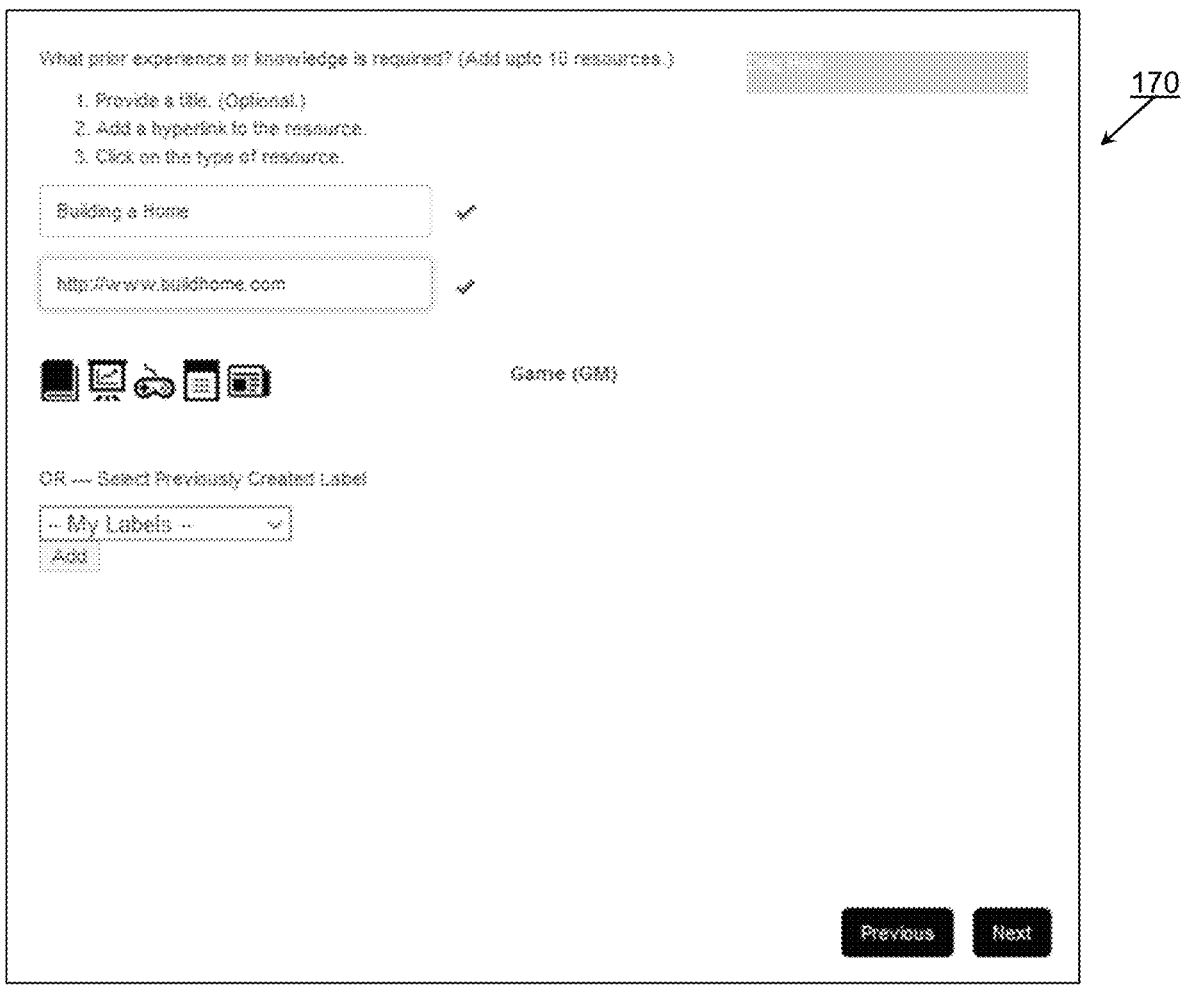
Figure 8D:
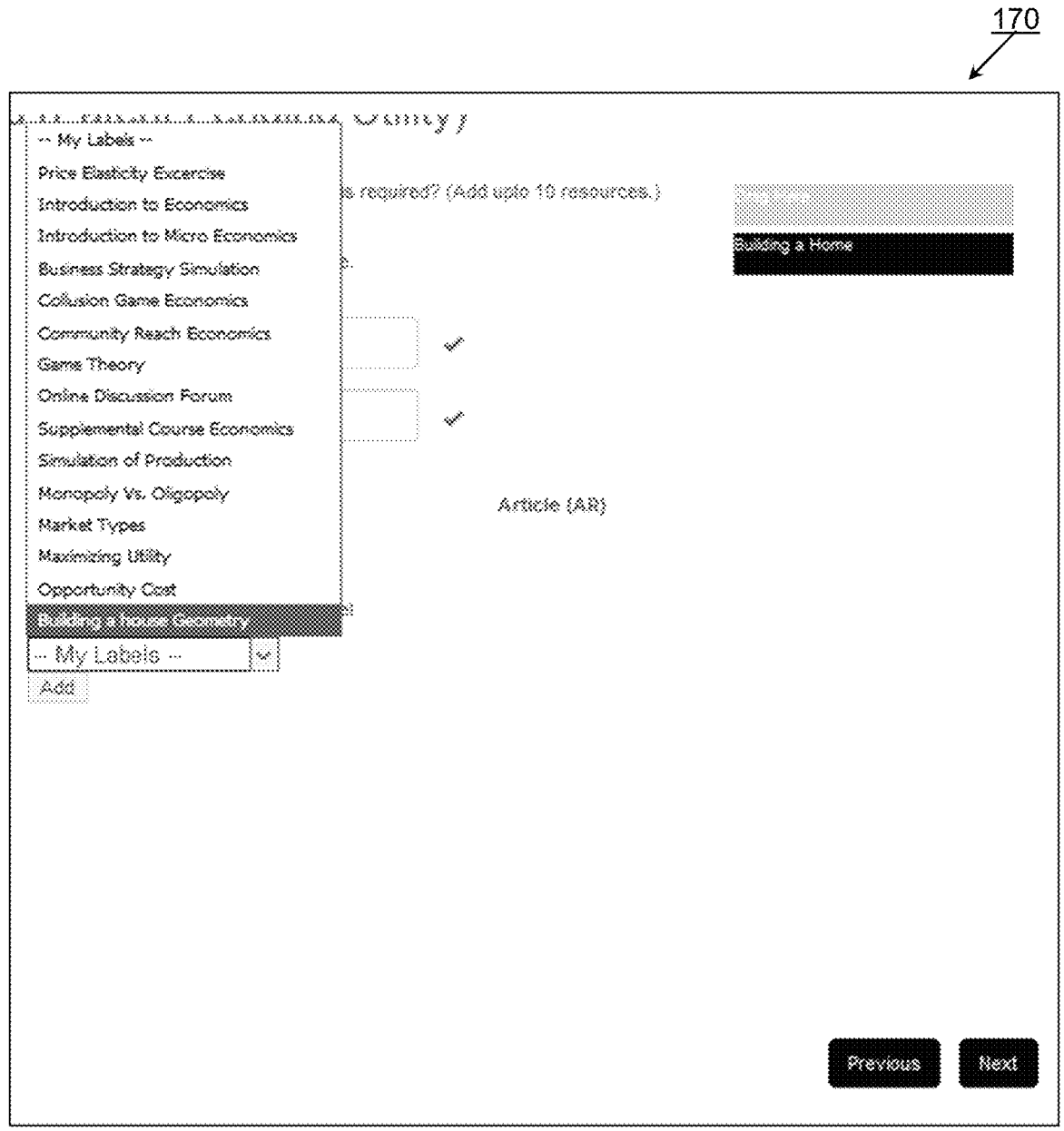
Figure 8E:

Upon entering step 5 of FIG. 8A, the provider is presented with an interface 170 such as depicted in FIG. 8B. In the interface the provider is prompted through a series of questions relating to the resource—such as whether software is required, whether rubrics or standards are associated with the resource, the level of engagement the resource requires for successful consumption, the size of a target audience for the resource and whether a credential is intended to be associated with the resource. A provider's answers to each of the questions causes the information to be saved and also represented by an icon or image intended to depict the "answer". Upon completing the entry of answers to the questions in FIG. 8B, the provider selects the "next" button at the lower-right and is advanced to a subsequent window as illustrated in FIGS. 8C-8E. Each of these windows are intended to characterize, with increased specificity, the prerequisites that a provider anticipates that a user of the resource should have in order to successfully consume the educational resource.

In the example depicted in FIG. 8C, the provider is characterizing the prerequisites for a resource on "building a home", and in FIGS. 8D and 8E the provider is presented with a list of existing labels to select from in order to create or edit the data for a resource, and prompted to enter prerequisites for the selected resource, respectively. Once the provider has completed entry of the information pertaining to an educational resource, the provider may be prompted to preview (step 10 of FIG. 8A) a skills label for the resource, where the label 120 reflects the information that has been entered by the provider and previously stored in the repository 120. The label is automatically prepared by the system and is presented and stored as a predefined format.

Figure 9:
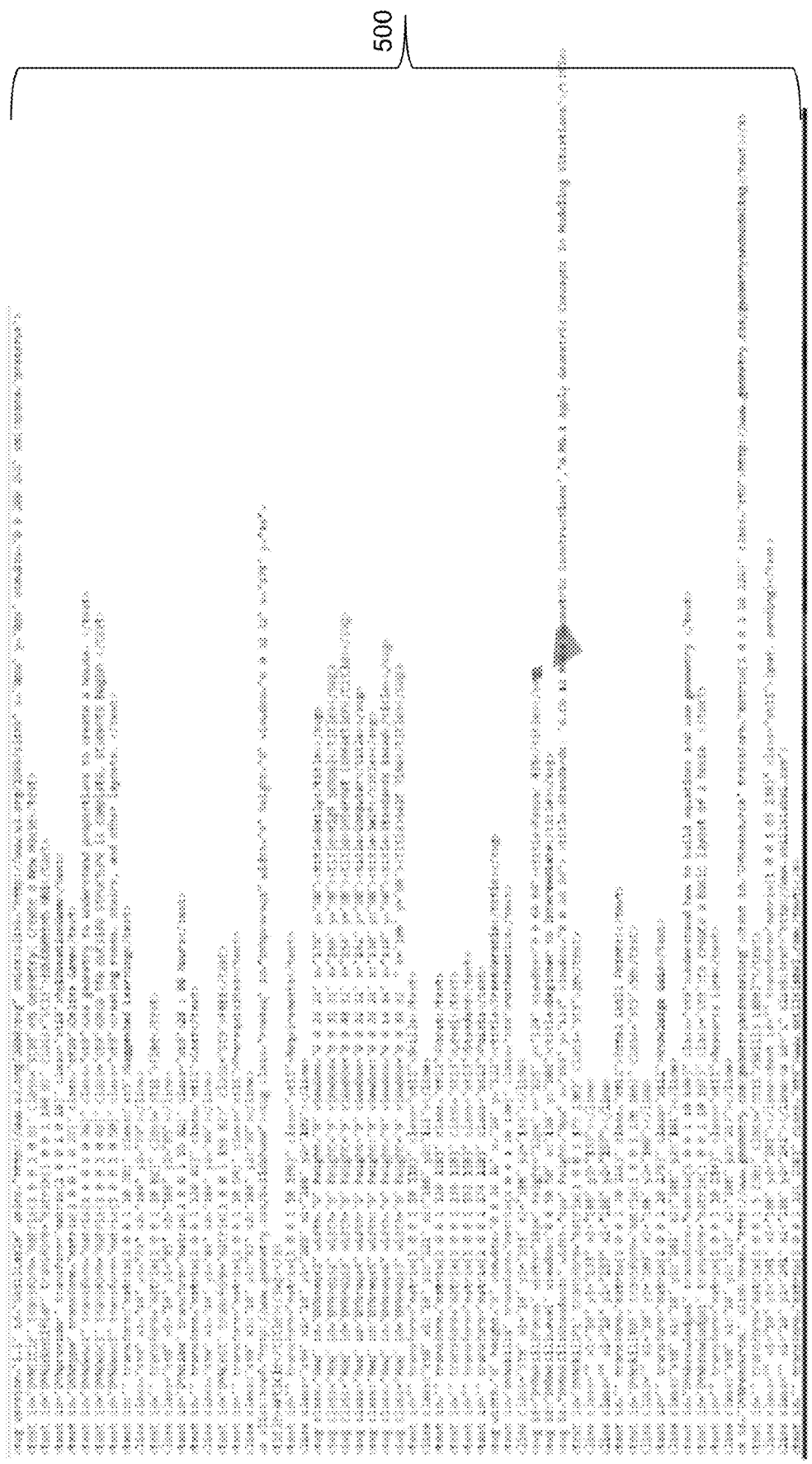
FIG. 9 is an illustration of a display depicting an exemplary code section for skills label generation in an SVG format.

In one embodiment the skills label display is produced as a SVG graphic—a popular XML, vector file type; the file is operable for print layouts. This file format was chosen for a few reasons. First, the vector maintains its dimensions as the size of the graphic changes. Therefore, the area of the display is controlled by the provider, user, viewer. Second, SVG is easy to store in the database or data repository. Third, SVG accepts CSS and JavaScript. Fourth, SVG has animation features. Fifth, SVGs have functionality to contain live hyperlinks (use to link to prerequisites and the actual resource with current implementation). Finally, SVGs are easy to render in code and there is a DLL file that includes all the functions needed to create the SVG displays. An exemplary code section for skills label generation in SVG format is found, for example reference numeral 500, in FIG. 9.

Another advantage of employing the SVG format is that a skills label, in its native SVG format, would permit the searching and cataloging of information from the label itself. For example, a parser could target the ID field to extract the relevant data. For a skill line item, the parser would read the fields: DYNSkill1, DYNSkill1Focus, DYNSkill1Level, DYNSkill1Standards, and DYNskillP1. Throughout, the prefix "DYN" signifies the field is dynamic. In other words, it would be possible to parse and search for a particular skills label in memory, and it would also be possible to search, sort and organize skills labels within memory, without access to a data repository 122.

Relationship Between the Components

Figure 10:
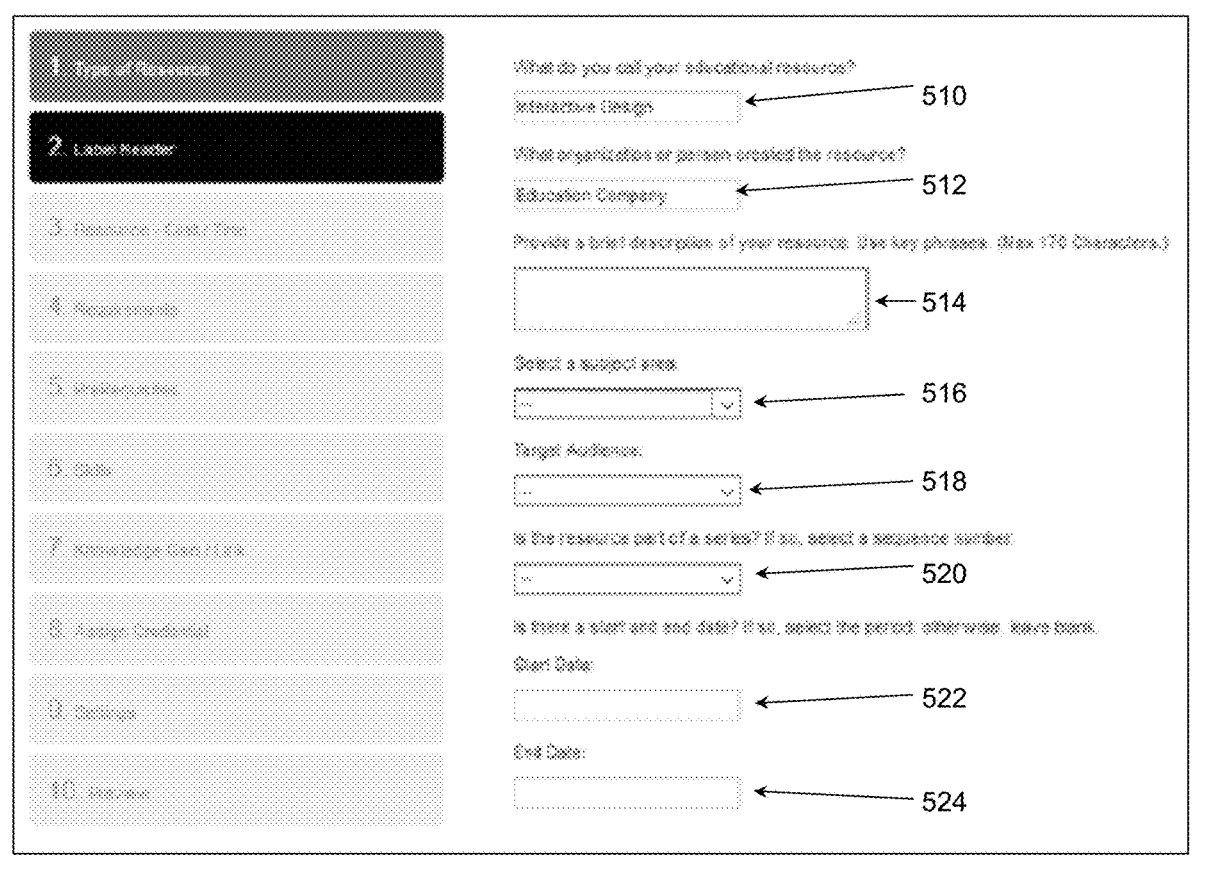

As noted relative to FIGS. 8A-8E, the design of the interactive system may be as a 'multi-step' wizard representing the various steps for the entry, by a provider, of information for each of the sections of the skills label. For example, referring to FIG. 10, after entering necessary information for the educational resource that will appeal in a skills label header, a teacher may clicks the 'Next' button and the fields related to the header section appear, and all other sections are collapsed or hidden for the time being. Each field has a label to guide a provider on input and a validation process, though the interface is meant to be intuitive. The provider can edit and make changes, and in one embodiment nothing is made available via the educational resource repository or database 122 until the Create Label step is completed. The data entered and associated reference numerals is depicted in the following table (Table B):

TABLE B

| Ref | Name | Field Type | DB Field | Validation |
|---|---|---|---|---|
| 510 | Title | Textbox | String | Max 70 characters |
| 512 | Provider | Textbox | String | Max 70 characters |
| 514 | Description | Textarea | String | Max 180 characters |
| 516 | Subject | Dropdown | String | Code |
| 518 | Target | Dropdown | String | Code |
| 520 | Sequence | Dropdown | String | Integer |
| 522 | Start Date | Textbox - Calendar | Date | Date |
| 524 | End Date | Textbox - Calendar | Date | Date |

After an educational resource record or "label" has been created and stored in the data repository, a provider has full access to read, edit, and delete the record in future sessions.

Figure 11:
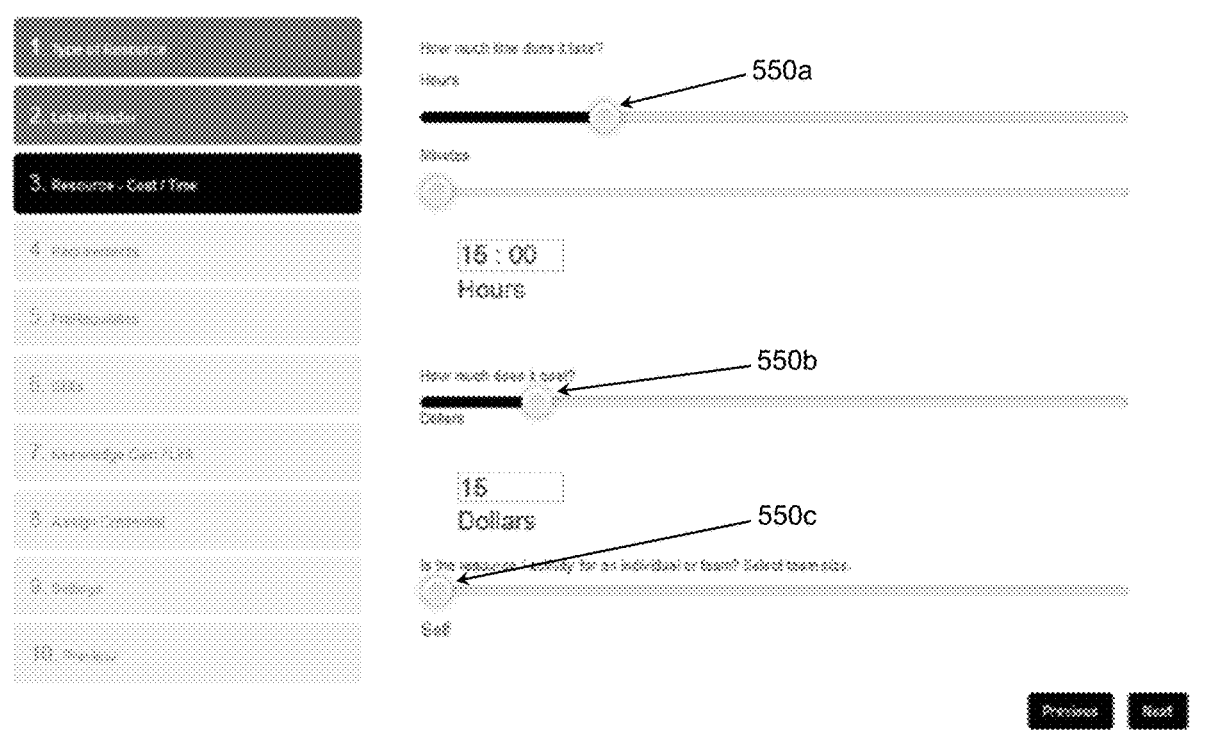

In summary, the 'label section' is where the provider creates or enters all of the information that is to be included for an educational resource and the associated skills label, by entering information to fill in an educational resource record, with the exception of the section related to skills. In one embodiment of the creation/editing interface 170, for example, FIG. 11, slider controls 550 may be employed by the user to enter or adjust for time, cost, and number of participants to reduce amount of required typing. More specifically, entry of the resources information as depicted in FIG. 11 includes the following data:

TABLE C

| Ref | Name | Field Type | DB Field | Validation |
|---|---|---|---|---|
| 550a | Time | Slider Hours: Slider Minutes | String | Must be in 00:00 format |
| 550b | Cost | Slider 0 (free) to $100 | Currency | Must be in currency |
| 550c | Self/Team | Slider 1 (Individual) to 100 (Team) | String | Must be 1 to 100 |

Once again, as previously discussed relative to FIGS. 8C-8E, icons are used to represent the prerequisites and requirements fields. As will be appreciated, the use of icons is meant to shrink the space needed to convey the information contained in the fields while representing a wide range of options. For example, up to about ten icons can be added on each line of the skills label. The prerequisites field also requires a hyperlink to the resource. For example, a user clicks on a link to access a book(s), file(s) (e.g., text, video, PowerPoint, etc.) needed for a course. A provider clicks on the icon or drags it over the display to add (assign) it to the resource. Prerequisites might be other educational resources themselves, which creates a cascading effect and a series.

Figure 12:
FIG. 12 is an illustrative example of a display window for user entry of skills information in accordance with an aspect of the disclosed embodiments.

The 'skills section' or step 6 in FIG. 12 is where a provider specifies what skills and skill competencies are gained from the educational resource being added to the repository. Referring to FIG. 12, and to Table D below, competencies are captured in focus values and level of difficulty levels, which are used to calculate a rating (skill points).

TABLE D

| Ref | Name | Field Type | DB Field | Validation |
|---|---|---|---|---|
| 1 | Skill | Textbox | String | Must be 70 less than 70 Characters. |
| 2 | Added Skill | String | | |
| 3 | Focus | Dropdown | Code | 1 to 10 |
| 4 | Level | Dropdown | String | 1 to 5 |
| 5 | Standards | Textbox | String | |
| 6 | Context | Textbox | String | Must be less than 250 characters |
| 7 | User can search to find skills and add them to skills. | | | |

Defining learning in this way, largely based on a set of skills and desired competencies, is an emerging trend with educators (but not implemented in a standardized way). In one embodiment, competencies is meant to evolve into something much more complex—bridging learning expectations laterally across disciplines, and vertically across education stages (middle school, high school, higher education, professional learning).

Defining learning gained from a resource or experience in skills and skill competencies has advantages. First, skills are standardized, with universally accepted definitions. (The database of skills for this application is also used with a Skills-Based Approach application.) Second, skills are understood across disciplines; educators, recruiters, employers, and policy makers all understand skills. Third, skills based learning is making headway in education because it is personalized and adaptive to the learner. Common Core is largely based on skills and is built into the interface of the label, both in the wizard interface and on the display. Colleges and universities are introducing competency based learning programs. Finally, skills work with traditional and emerging learning technologies and applications. You can define skills learned in not only traditional courses and activities, but also online games and courses.

There are two sections. In the first section, the provider can enter a skill, choose a skill level, and then click the 'add' button to add a skill line item on the dynamic graphic (and in a list underneath the textbox). In the second section, the provider has a search mechanism to find skills. Possible search terms include: a job title or field, skill type (technical, thinking, etc.), personality trait, etc. (This same search is used in a Skills-Based Approach application.) When the provider clicks the button Find Skills, a list of skills appears below. To add skills to the label, the provider drags the skill over the label or to the skills list or clicks on a '+' icon. Skill points are useful not only as a representation of the return, for example in a ROI calculation, but also in leaderboards and other game like intrinsic motivators.

Figure 13:
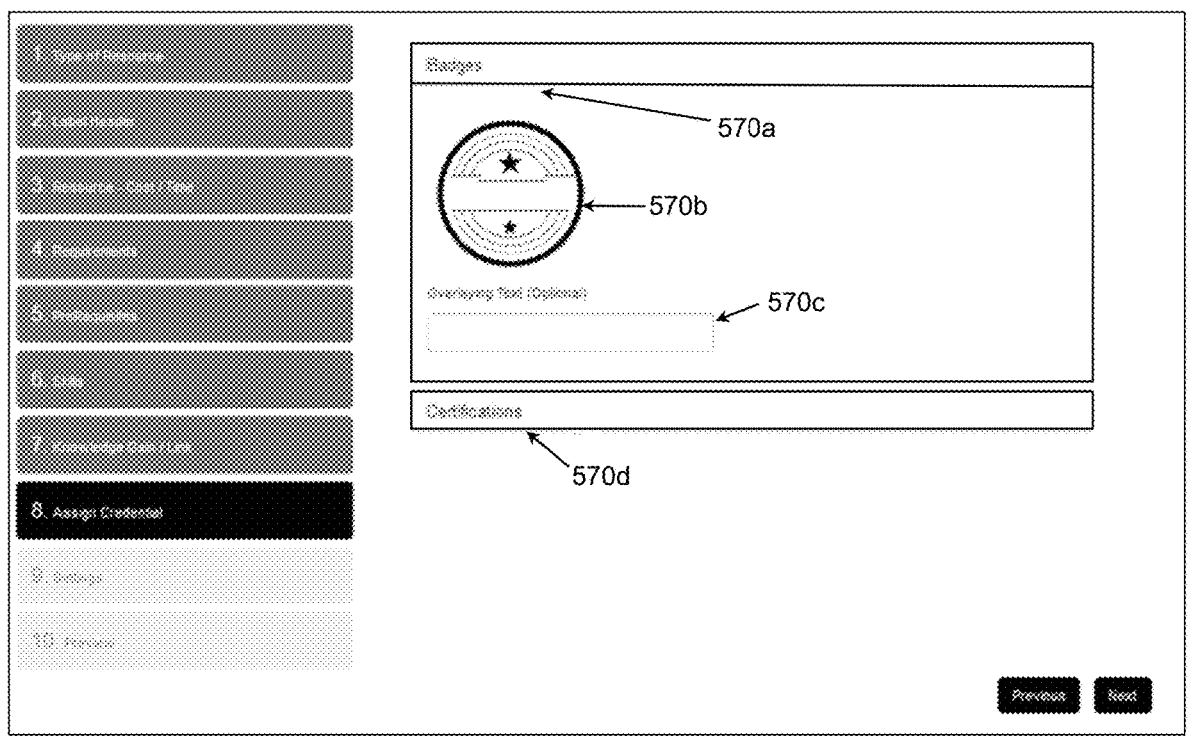
FIG. 13 is an illustrative example of a display window for user entry of credential information in accordance with an aspect of the disclosed embodiments.

Referring next to FIG. 13, within the assign credential step 8, the provider may assign a credential to be associated with the educational resource and skills label for that resource. The depicted embodiment includes an online badge, and like the skills label the badge is a SVG-formatted file as well. This is an optional element for the educational resource and the provider has the option to separate the label and badge files. The information associated with the certification is presented in Table E below and the reference numerals for each of the certification fields are described.

TABLE E

| Ref | Name | Field Type | DB Field | Validation |
|---|---|---|---|---|
| 570a | Badges | Textarea | String | Must be less than 180 characters. |
| 570b | Badge | Image | String | Code |
| 570c | Overlaying Text | Textbox | String | Must be less than 70 characters |
| 570d | Certifications | Image | String | Code |

To assign the badge to the label, the provider double-clicks on the icon or drags the badge over the label. Subsequent implementations may include an expanded use of credentials to include certifications, awards, and/or licenses.

The final pieces of information to be entered into the educational resource record are related to the settings step 9. Using the settings the provider has the option of: including a label header or badge with the label and making the label publically accessible (in the search engine). In alternative embodiments of the process it may be possible to include more options that are controlled by the settings step. For example, one option will be to include or reference a customer feedback rating section or forum (with a title, rating, and feedback). The specific information entered in relation to settings is set forth in Table F below:

TABLE F

| Ref | Name | Field Type | DB Field | Validation |
|---|---|---|---|---|
| 1 | Participation | Textbox | String | Must be less than 70 characters. |

TABLE F-continued

| Ref | Name | Field Type | DB Field | Validation |
|---|---|---|---|---|
| 2 | Share | Image | String | Code |
| 3 | Include Badge | Textbox | String | Must be less than 70 characters |
| 4 | Include Header | Checkbox | Int | Code |
| 5 | Include Feedback | Checkbox | Int | |

To complete the process, the provider clicks on 'Create Label' button that: validates the input, stores content in the educational resource repository 122, and redirects to the 'Display Page' as shown in FIG. 5. From the 'Display Page', the provider can: download the label as a SVG, PNG, or PDF file, download a QR Code as PNG, and access a unique URL for the Skills Label. The URL is a link the provider publishes in online content; it is also included in the SERP, QR Code, and all references by the system to promote the Skill Label.

Summarizing the operation of the disclosed system and method, at least one user interface is operable to create and edit or update a user record with information. And, the information associated with an educational resource record may include or be selected from those associated with skills labels as represented by numeral 120 in the various figures. The user interface (e.g., 170), is operable to add, edit or delete an educational resource record and information associated therewith. The interface may also be, as suggested, operated or accessed to search and identify educational resources based on a search of the data entered and stored in the educational resource data repository 122 during the creation and verification of an educational resource record. As illustrated, for example in FIGS. 5, 6 and 7, a search conducted via the user interface 170 returns a collection of educational resource records meeting at least one search criteria as entered by the user (searcher), and the identified education resource records are each represented on a dashboard or similar interface display as icons 310 with associated information from the respective skills label.

Once the educational resource record data is complete, the record may be subject to a verification process before a skills label is associated with the resource. For example, assuming that a provider or teacher (e.g., game creator, educational publisher, etc.) creates an educational resource record. The user, via the interface provided by system 100, enters requirements and prerequisites. The user also sets a time parameter, and assigns skills. For each skill added, the user sets a focus value, level of difficulty, and if applicable, standards. Skill points are then calculated for the educational resource based on the focus value, level of difficulty, and time elements. At this point the educational record is ready for review and verification.

Figures 14, 16:
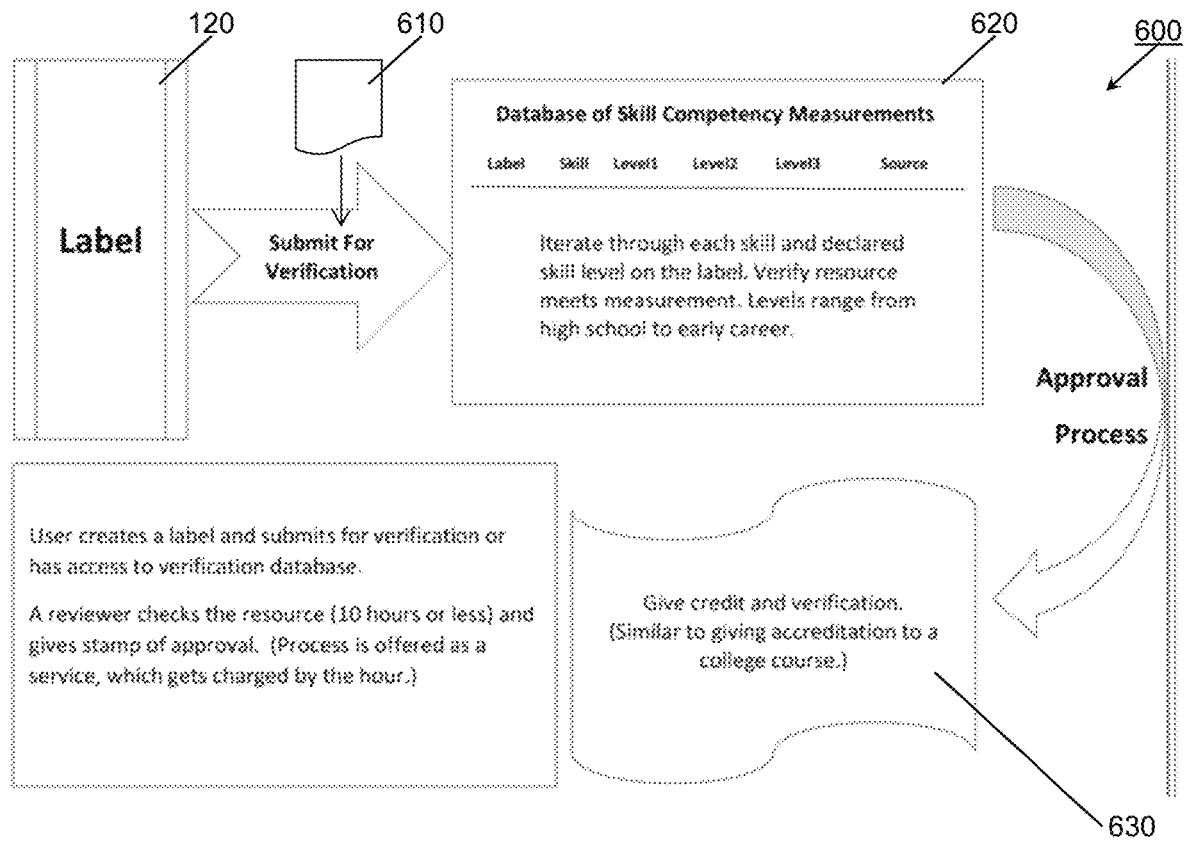
FIG. 14 is a block diagram illustrating an exemplary verification process in accordance with an aspect of the disclosed embodiments.
FIG. 16 is an illustration of an exemplary dashboard for a skill check feature of the disclosed embodiments.

Referring to FIG. 14, there is illustrated an exemplary verification process 600 for an education resource represented by the skills label 120. For example, a creator creates a new educational resource and associated label, either using the online process described above (one at a time) or uploads a collection of resources using a comma-separated values (CSV) upload of the necessary educational record information. Then the system may add the record in the repository, where the learning is defined in skills, competencies, and overall knowledge gain. To initiate the review and verification process, the creator or provider creates a ticket 610 for the review. The ticket 610 includes a copy of or link to the educational resource itself (e.g., access to the book, a video of the activity, access to the game or VR experience), and may optionally use markers to designate where skills are applied (e.g., chapter or pages in a book, level(s) in a game, time segment in a video), and a set of standards, if applicable.

Figure 15:
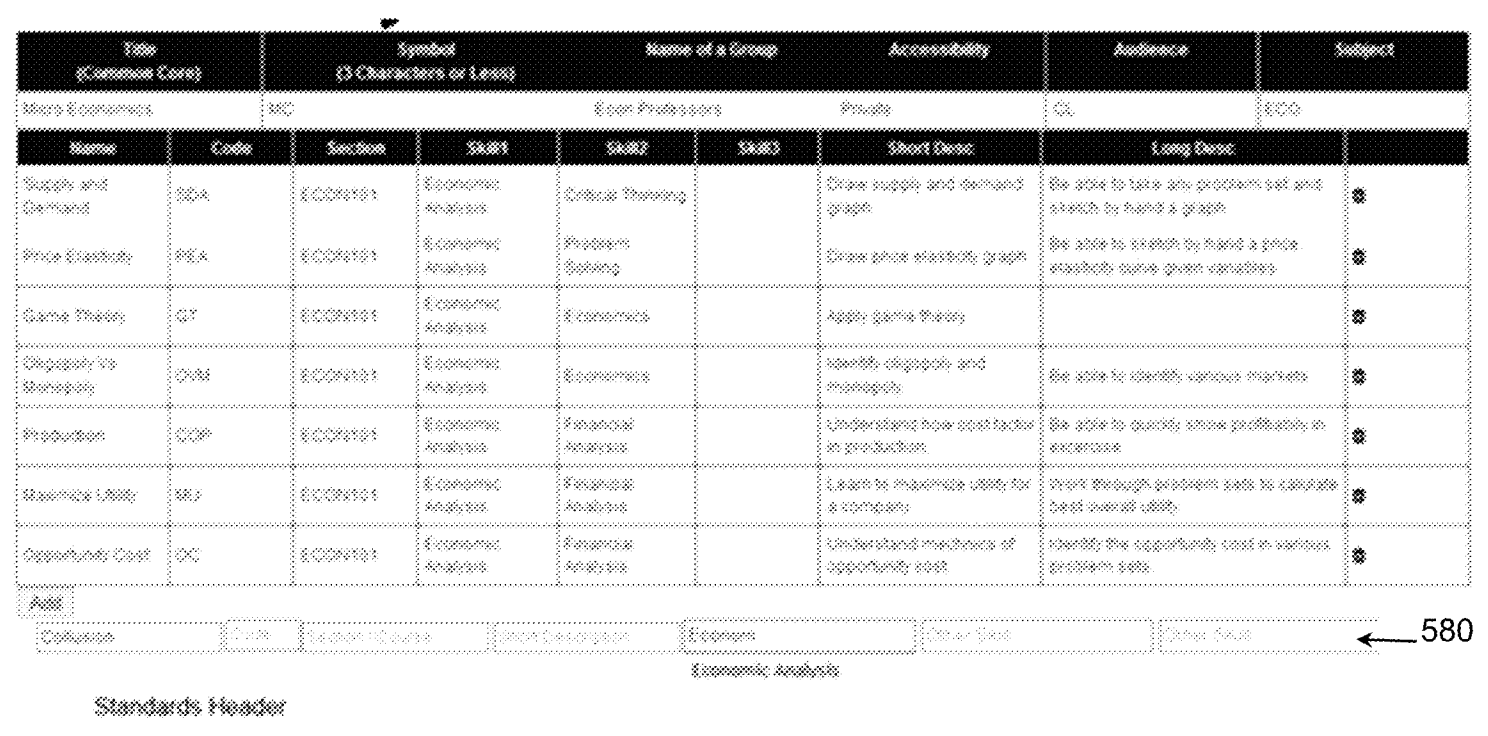

Referring briefly to FIG. 15, depicted therein is an exemplary interface by which a "standard" may be entered into the system. As will be appreciated, while a standard may be associated with an educational resource (the resource meeting the standard), the standards are separately entered and maintained with the system 100. The entry of a standard may be accomplished by single standard entry via the display interface of FIG. 15, for example by entry or selection of fill-in data associated with one or more data fields 580 along the bottom of the interface. The fields may include, among other data, a title for the standard, a symbol (icon), the name of a group or target to which the standard is directed (e.g., high school students), the type of accessibility to the standard (whether provider specific or applicable across many resources), an intended audience or level, and the subject of the standard. By linking or identifying a standard with an educational resource, as described herein, the standard would be considered by a reviewed when the resource is submitted for verification. Once the ticket 610 is prepared, the review process (system) accepts the ticket, and a review and verification is completed in one of at least two methods contemplated. The first verification method is a semi-automated process that requires the input of a reviewer. Initially, the system provides a dashboard, which includes: the underlying methods for each skill, a timeline or graph with the markers, and for each skill: the ability to check when a method is being applied and for a duration (when a method has started and ended).

As the reviewer consumes the resource (e.g., reads the book, plays the game, simulates an experience, completes a course), the user uses the dashboard 620 to mark each time a skill is being learned. Overlapping of skills happens and is picked up during the review process. In the programmed software application, for which an example dashboard is presented in FIG. 16, the skill check feature is implemented with a simple checkbox ("x" in right-most column) that works like a counter. When the skill box is checked, it adds to a tally (for the skill->method) and then resets back to being empty. A time-span feature is implemented by putting a start and end marker on a timeline. Time (focus) is measured by summing up all the segments for each skill.

The disclosed verification also contemplates the use of integration of standards, and in the event standards are applicable, the educational resource is reviewed and verified with respect to such standards. The reviewer interprets the standards and uses judgement on their application. For instances, an expert reviewer may be identified and used for the standards he/she has domain knowledge in—a reviewer might know Common Core and mathematics—so accepts and reviews educational resources in this area.

In the automated or system-conducted review process, the process starts with the system consuming, or simulating the consumption of, the resource. For example, the system may be programmed to reads words in an article or book electronically, or to play the game. In doing so, the system compares knowledge before consuming the resource with knowledge after consuming the resource in order to characterize or determine the knowledge gained. Each skill is tested is tested or reviewed in this manner. And, while doing so, the system may look for keywords or other triggering features of the resource as ways to identify how and when a skill is taught by the educational resource (i.e., simulating the acquisition of the resource by a user).

Whether the review and verification is accomplished using a semi-automated and/or an automated process, the disclosed embodiment is meant to create enough separation of skills between difficulty levels, while at the same time acknowledging both the focus and time spent consuming the resource.

Chart 1: Calculation of Skill Points

| Coefficient | 2 | | | | | |
|---|---|---|---|---|---|---|
| Difficulty Coefficient | 0.1983046 | | | | | |
| Hours | 10,000 | (Time * Focus * Coefficient)^((Difficulty + 4) * Dificulty Coefficient) | | | | |
| Target Growth Rate | 4.51 | | | | | |

| Difficulty | 1 | 2 | 3 | 4 | 5 | Total Points |
|---|---|---|---|---|---|---|
| Time Spent | 2000 | 2000 | 2000 | 2000 | 2000 | |
| Focus Value | 0.5 | 0.5 | 0.5 | 0.5 | 0.5 | |
| Points | 1,875 | 8,466 | 38,218 | 172,535 | 778,907 | 1,000,000 |
| Points Per Hour | 0.94 | 4.23 | 19.11 | 86.27 | 389.45 | | system next calculates the intensity (time and focus) and frequency that a skill(s) is applied throughout the experience. In one embodiment, this intensity is determined by summing each check and time segment per skill. Next, using the intensity and frequency values for each skill, the system validates assigned focus values and level of difficulty (based on the level of difficulty in the methods behind the skill).

As defined above, Skill Points are a unique representation or characterization intended to allow a learner or other consumer of an education resource to quickly compare or contrast one educational resource with another. The inclusion of skill points on a skills label is analogous to a listing of the "percent daily value" for a nutrient or the "calories per serving" for a food label, the skill points for an educational resource are determined or calculated based on skill focus values, time, and level of difficulty associated with the educational resource. Skills points may, in some cases, provide an alternative representation of "credit" and are meant to provide extrinsic motivation for a student (e.g., K-12) to demonstrate the acquisition of knowledge by accumulation of skill points when resources are consumed.

As noted earlier, not all learning gets equivalent attention, especially if it is not backed by an organization, accreditation board, government entity, etc. Indeed in traditional U.S. schools, much of the learning does not directly link to skills, but rather to grade level and education stage. Nonetheless, thinking in skills is believed to be a good way to connect learning across stages. Skill points attempt to put some credit towards learning, whether it takes place in or outside of a classroom. A skills label can be verified by a review (verification operation described above), so there is some level of accountability or accreditation. Furthermore, linkages are present between the skill points associated with an actual resource, such as a skills-based approach mobile application, and on a website(s) or other displays of a user's (student's) performance are found; where leaderboards, badging, and other game mechanics can be introduced.

The use of skills points as a characterization of an educational resource, while serving as a common metric that can be used by someone searching and reviewing available resources, also differentiates skills labels from other means used to characterize available resources. Moreover, skill points provide the further possibility of cross-integration with the other applications. Some validation.

In one embodiment, skill points associated with a particular educational resource can be calculated using a formula. While alternative formulae may be employed, the Once the review is completed, and the skills are evaluated, the system returns result to reviewer. In the event the results match or exceed the original learning expectations on the educational resource, then the educational resource is verified as represented at step 630 in FIG. 14, and an associated record and label gets a 'stamp of approval'. For example, the 'stamp of approval' may be a single SVG graphic (used for all labels) signifying the accuracy/verification of the learning expectations on the label. Moreover, the 'stamp of approval' may appear on the label itself. On the other hand, if the results fail to meet expectations or are not accurate, then the Teacher or Provider receives a notification (e.g., an email response) listing the assessment values and any particular discrepancies in order to facilitate revision to the resource and subsequent re-submission of the educational resource.

In summary of the verification operations, the disclosed embodiment permits a provider to create a ticket or similar request 610 for the review and verification of the educational resource. Assuming that the educational resource is represented by the educational resource record in the educational resource repository, the ticket includes a copy of or link to the educational resource itself and, if applicable, a set of standards. The applicability of standards could be determined or designated by the resource provider. Verification further includes "consumption" of the educational resource and a characterization of the knowledge gained as a result of such consumption so that a skill(s) is applied and an intensity and frequency of the skill(s) can be calculated from such consumption. By evaluating the intensity and frequency for the skill(s), the educational resource is validated. For example, the calculated intensity and frequency can be compared against the levels indicated in the resource's record, against identified standards, etc.

In an alternative verification operation, which may or may not be performed in conjunction with the above, the system seeks to verify that the learning expectations and outcomes associated with an educational resource are accurate. In doing so the system may perform operations including one or more of the following: (a) sending information for an educational resource record, along with access to the resource itself, to a third party for a reviewer; (b) the third party reviewer receiving a request and the associated information for the resource and, using a dashboard containing the resource (skills label) data, consuming the educational resource. While doing so, a list of underlying methods and applications of the skills from the educational resource record may be displayed on a dashboard, and the third party reviewer interacts with the system via the dashboard to track and verify a skill(s) is gained based on the frequency and intensity of applying the skill(s) while consuming the resource.

How the Disclosed Embodiment(s) Works

In an exemplary embodiment, the disclosed system and method(s) is constructed using a server hosting an online website application that is fully integrated with a database. For security purposes, the system has a secure login feature. The system includes a user interface that operates with JavaScript to make it interactive and intuitive by applying the latest user interface (UI) mechanics, such as drag-and-drop and mouse-over effects.

Figure 17:
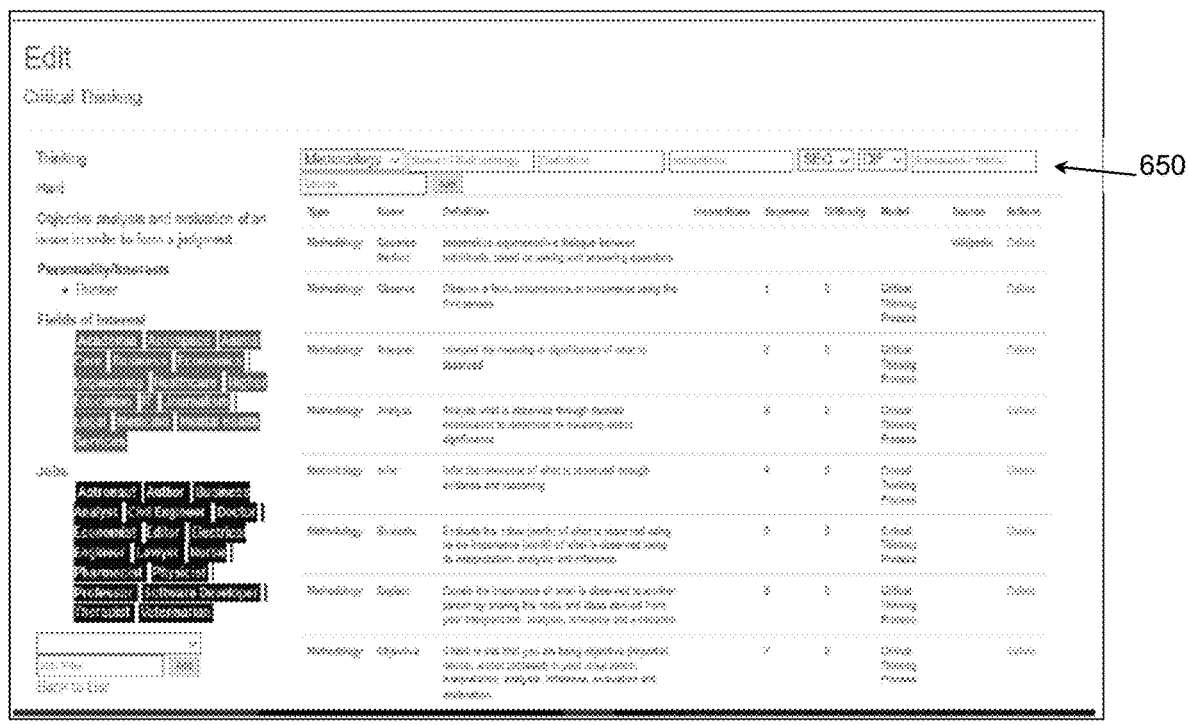
FIG. 17 provides an exemplary display of at least a portion of an educational resource record in an editing interface in accordance with an aspect of the disclosed embodiments.

Another feature of the system 100 is the ability for a creator or provider of an educational resource to review and/or edit an existing resource record. For example, as depicted in FIG. 17, the record information can be displayed via an interface on a workstation or other device and an approved creator or provider may be permitted to edit the record for an educational resource. As depicted I the example of FIG. 17, the user that is performing the editing operations may further add, modify or delete the skills associated with the educational resource. The process of assessing a skill is accomplished by completing entry of information in the fields 650, where the entry of the skill type, skill name, skill definition, skill instructions as well as sequence, difficulty, etc. are entered or selected from a drop-down menu.

Figure 18:
FIG. 18 is an illustration of a comma separated values import interface in accordance with an aspect of the disclosed embodiments.

In addition, there is a multiple upload feature to create many educational resource records or skill labels at once. For example, a provider may create or fill in a CSV file based on a predefined specification, and then upload the file to the educational resource data repository. As will be appreciated, the CSV file should be in the form and format as described relative to the educational resource repository schema in FIG. 4 in order to facilitate the import of the CSV data. For example, the interface display illustrated in FIG. 18 is a representation of a CSV Import interface, where the upload of one or more sets of data associated with an educational resource to be added to the repository can be initiated by selecting the "choose file" button 670 (which may open a file-selection window), followed by the create button 672. Subsequently, the system processes the file and generates a record in the repository along with an associated skills label that pass validation to the database. Providers can then read and modify the educational resource record using the interactive interface such as described below and depicted in FIG. 17.

How to Make the Disclosed Embodiment(s)

Making the disclosed embodiment(s) involves: creating a UI for teachers and learners, building the SVG display, integrating the latest skill definitions, constructing a search function, developing the database, drawing sets of icons, designing an algorithm to calculate skill points, and building a dashboard and process for verifying learning expectations are met.

The system/method wherein sending information for an educational resource record includes a method of access selected from the group consisting of: providing the resource itself, mail a hard copy of a resource, e-mail a digital copy of a resource, making a copy of a video game available for use, via Internet, and by capturing or recording the resource for subsequent access by another.

In further embodiments, the disclosed system and method further contemplates the inclusion of additional features and functionality such as automated verification, user feedback forum, and an expanded credential section. As described above, the verification process involves sending the educational resource record to the system for review. A reviewer, with or without the assistance of the system, iterates through each of the skills assignments and checks the desired skill competencies to confirm that the resource accurately provides or meets the competencies. If the educational resource passes verification, the label gets assigned as a 'stamp of approval'.

Finally, the disclosed embodiment further contemplates an added-value feature of allowing users to search on educational resources via an online interface, and being able to view related skill labels for the resources matching a user's search criteria. The database of information collected from the labels seeds the search engine. So a user will be able to search on: skills and skill competencies, providers of resources, type of resource, cost of the resource, etc. A search engine result page ("SERP"), such as depicted in FIG. 5, returns a list of links to skill labels (title, description, and URL/hyperlink). This search engine of learning resources is built for a website and mobile application.

How to Use the Disclosed embodiment(s)

Providers of an educational resources log into the system—a website application at skills label. They click on a link and are taken to a page to create a skills label. The system guides them through a step-by-step process. The implementation is meant to be intuitive by design. Providers click on each step as the header of an 'Accordion', the sequence is determined by the order of appearance of the headers.

In an alternative implementation a more guided experience may be provided for the Providers. For example, they may be asked a series of questions or presented with selections, and served a user interface to add related information. For example, the system prompts: "Does your resource require any hardware or software to function?" If the provider has a positive response, the system shows a list of hardware and software to add to the label. Through the process, the provider creates a skills label (label header, label, assigning skills), designates a credential (badge, license, award, etc.), and makes the resource accessible to an audience (online-webpage, SVG, QR Code and print—PNG or QR Code). In addition, during the process, the system creates a new unique identifier which can be used to catalogue the resource.

Perhaps, with the labels, the end user might also be a system or search engine or another software application. Skill points act as the ranking. All the rest of the data can be manipulated. Other consumers of skills label are systems—search engines, learning management platforms, etc. For example, a system such as a search engine or another application might also be a consumer of the skills labels. In one contemplated embodiment, a search engine or application may employ a skill points algorithm to "rank" and "order" the results for another search engine or to add value for a parser or application making it easier for a learner (e.g., student) to make a decision on consuming the resource.

Figure 19:
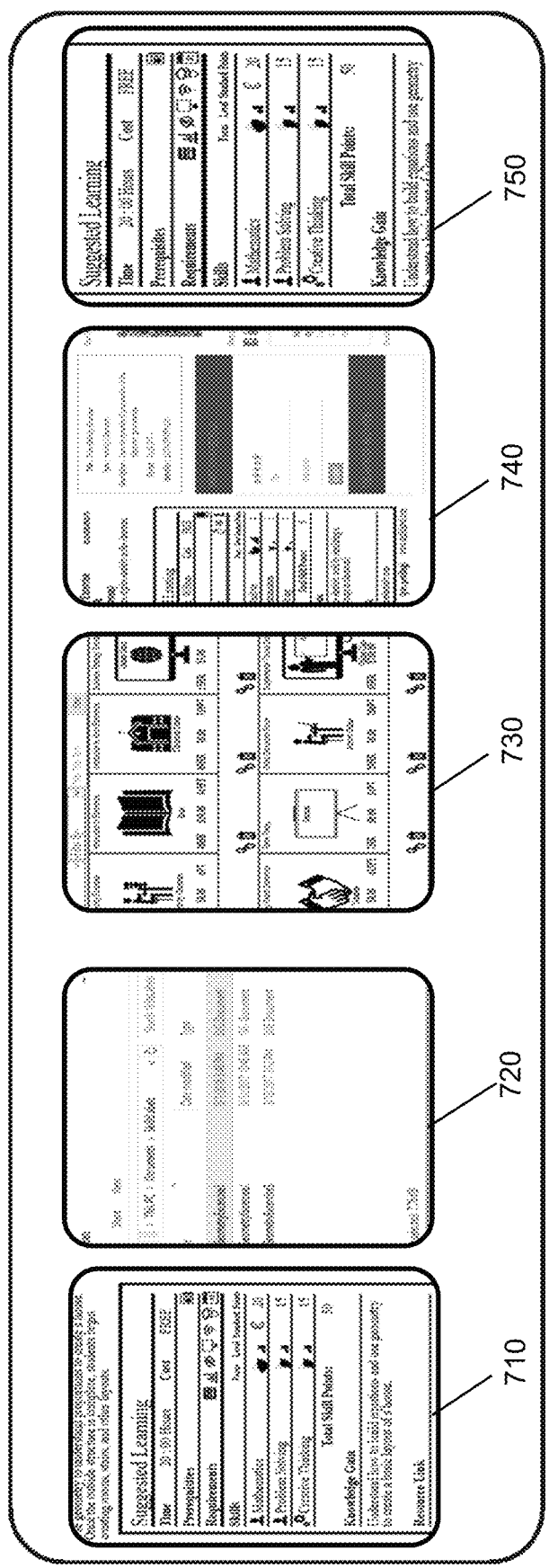
FIG. 19 shows illustrative examples of the manner in which the skills labels may be viewed or displayed in accordance with an aspect of the disclosed embodiments.

Turning next to FIG. 19, depicted therein is an illustrative example of the manner in which the skills labels described herein may be viewed or displayed for a provider. The illustration is intended to illustrate the multiple formats in which the skills labels can provide information about an educational resource—in particular how the skills label itself not only illustrates information for a viewer, but that the digital file used to render the label similarly has data therein. Label example 710 represents an example label as presented or rendered on a visual display in a browser or mobile app. Label display 720 represents an excerpt of information in the nature of a skills label file stored on a computer or in a memory. Skills label display 730 is a rendering of common portions of a collection of labels in the manner of a matrix that provides a simplified and limited display of the information associated with several labels, such as may be returned from a search or listing operation. Label example 740 is intended to provide an example of the information or rendering of the label in association with a public URL, and example 750 is intended as a representation of a skills label as it may appear on a book, package or similar goods.

I am a student reading a Skills Label. It might be immediately clear the definition of a skill, or how related fields are applied. An application might aid the student to understand how a learning resource relates to their desired learning outcomes (learning path).

As an example of a similar function, consider professionals applying to a job and providing their resume, there are applications to parse the resume to aid some recruiters—both in providing an initial screen and identifying key phrases. Resumes are still a standardized, well established display, but there are tools to consume them. In a similar manner, with a skills label, a user downloads the skills label file from the application or memory where it was previously stored. Then, the downloaded skills label file (e.g., SVG format), is easily transferred to and parsed by another application. An application can then upload the label, which does not require a database call through an application programming interface (API). As with the resume, this is accomplished by having a standardized framework captured in an easily read file format.

There are two benefits that derive from the inclusion of such information in relation to an educational resource and skills label. First, the interface has a ranking system based on Skills Point and ROI. This is useful for systems, which work with learning resources. Second, the format of the labels is in SVG (XML) so is easily parsable. A machine can easily read a Skills Label. Furthermore, software applications/technologies might assist a user in understanding what resource to consume.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A system operating in association with a computer network, for the creation and display of a skill label representing a standardized display of skills acquired as the result of a user's consumption of an educational resource, comprising:

one or more processors suitable for executing programmable code and accessing memory operatively connected thereto, said processors and memory forming at least part of the computing network;

an educational resource data repository in the form of memory containing a plurality of records, one for each educational resource, each record including: a unique identifier for each resource, a link between each identifier and at least one resource, and data fields containing information related to the resource and at least one skill associated with the resource;

a user data repository where personally identifiable information is stored in a user record associated with each user, the user record further including information indicating the educational resources that the user has acquired;

a common label format, referred to as a skills label, providing representation in said skills label of at least one skill associated with each educational resource where the at least one associated skill represented in the skills label is a skill gained by the user's consumption of the educational resource, said skills label further representing at least a portion of the information stored in the educational resource data repository for the associated educational resource;

a label output engine, operating on at least one of said processors, to automatically produce a graphic file incorporating data from the educational resource data repository, where said graphic file includes at least one graphical representation of the data from the educational resource data repository, said graphic file, upon rendering by a suitable output device, providing a visual and data representation of the skills label information in the common label format, wherein the visual and data representation of skills labels for different resources contain common elements including at least one skill associated with each of the different resources and thereby enabling the user to easily to compare and contrast the different resources; and at least one user interface, operating under the programmatic control of a software application capable of interacting with at least one of said educational resource data repository or said user data repository, for creating and editing an educational resource record or a user record, respectively.

2. The system according to claim 1, wherein said skills label is automatically created by the one or more processors by transforming information stored in the data repository into one or more graphical representations thereof.

3. The system according to claim 2 wherein the suitable output device is in a form of a portable computing device, and where information stored in the educational resource data repository, and rendered by the suitable output device, includes a plurality of data fields selected from the group consisting of: resource title, resource provider, resource type, resource description, unique identifier, completion time, resource cost, prerequisites, requirements, skill(s) category, skill(s), focus, standard, skill(s) difficulty, skill points for each skill, total points for the resource, knowledge gained, and a resource URL.

4. The system according to claim 1 wherein an educational resource is selected from the group consisting of: books, games, websites, online learning, and activities where users gain knowledge or experience, massive open online courses, activities, virtual reality, online games, video games, gamification, experience.

5. The system according to claim 1 wherein, each skills label includes information selected from the group consisting of: a subject matter code, resource code, sequence code, provider/author code, title, and requirements, and the data fields contain information related to a plurality of skills associated with the resource.

6. The system according to claim 1 wherein said at least one user interface, is operable to:
- update a user record with information selected from the group consisting of: (i) skills labels associated with the user's record based upon discrete tasks accomplished by the user, and (ii) related personal information for the user;
- search and access educational resources within the educational resource data repository based upon specified criteria; and
- add, edit or delete an educational resource record and information associated therewith.

7. The system according to claim 6 wherein said at least one user interface, is operable by an administrator to search and identify educational resources based on data entered and stored in the educational resource data repository during the creation and verification of an educational resource record, where a search conducted via the user interface returns a collection of educational resource records meeting at least one search criteria, and where the identified education resource records are each represented as icons with associated information from a respective skills label; and wherein associated information from a respective skills label is suitable for the user to make a return-on-investment calculation while comparing the search results, and where the information includes: time taken to consume the resource, how much the resource costs, and total skill, points earned from the resource.

8. The system according to claim 1 further including at least one process, operating under the programmatic control of the software application capable of interacting with at least one of said educational resource data repository or said user data repository, for at least semi-automatically providing for the review and validation of an educational resource and the generation of the associated skills label.

9. The system according to claim 1, where information stored in the user records includes a plurality of data fields selected from the group consisting of: job title, job field, skill type, skill set, skill points, standards, desired competency, and learning expectation.

10. The system according to claim 9, where the common label format provides for the representation of information pertaining to employment selected from the group consisting of: job title, job field, skill type, skill set, skill points, standards, desired competency, and learning expectation.

11. A system operating in association with a computer network, for the creation and display of a skill label representing a standardized display of skills acquired as the result of a user's consumption of an educational resource, comprising:
- one or more processors suitable for executing programmable code and accessing memory operatively connected thereto, said processors and memory forming at least part of the computing network;
- an educational resource data repository in the form of memory containing a plurality of records, one for each educational resource, each record including: a unique identifier for each resource, a link between each identifier and at least one resource, and data fields containing information related to the resource and at least one skill associated with the resource;
- a user data repository where personally identifiable information is stored in a user record associated with each user, the user record further including information indicating the educational resources that the user has acquired;
- a common label format, referred to as a skills label, providing representation in said skills label of at least one skill associated with each educational resource where the at least one associated skill represented in the skills label is a skill gained by the user's consumption of the educational resource, said skills label further representing at least a portion of the information stored in the educational resource data repository for the associated educational resource, wherein said skills label is automatically created by the one or more processors by transforming information stored in the data repository into one or more graphical representations thereof,
- wherein said skills label includes skill points for each skill calculated using information stored in the educational resource data repository based upon, at least, a skill focus value, a completion time, and a skill difficulty associated with each educational resource, and at least one graphical representation for at least one data field selected from the group consisting of: prerequisites, requirements, skills, and focus;
- a label output engine producing a graphic file incorporating data from the educational resource data repository, said graphic file, upon rendering by a suitable output device, providing a visual and data representation of the skills label information in the common label format, wherein the visual and data representation of skills labels for different resources contain common elements including at least one skill associated with each of the different resources,
- wherein the suitable output device is in a form of a portable computing device, and where information stored in the educational resource data repository, and rendered by the suitable output device, includes a plurality of data fields selected from the group consisting of: resource title, resource provider, resource type, resource description, unique identifier, completion time, resource cost, prerequisites, requirements, skill(s) category, skill(s), focus, standard, skill(s) difficulty, skill points for each skill, total points for the resource, knowledge gained, and a resource URL; and
- at least one user interface, operating under the programmatic control of a software application capable of interacting with at least one of said educational resource data repository or said user data repository, for creating and editing an educational resource record or a user record, respectively.

12. A method, operating in association with a computer network and one or more processors suitable for executing programmable code and accessing memory operatively connected thereto, said processors and memory forming at least part of the computing network, for the creation and standardized display of skills in a common skills label format associated with a user's consumption of an educational resource, comprising:
- populating an educational resource data repository, in the form of memory containing a plurality of records, one for each educational resource, each record including: a unique identifier for each resource, a link between each unique identifier and at least one resource, and data fields containing information related to the resource;
- creating a user data repository wherein personally identifiable information for each user is stored in a user record associated with the user, the user record further including information indicating the educational resources that the user has acquired;

providing for the representation of at least one skill associated with each educational resource using a the common label format, referred to as a skills label, where the at least one associated skill represented in the skills label is a skill gained by the user's consumption of the educational resource, said skills label further representing at least a portion of the information stored in the educational resource data repository for the associated educational resource, wherein said skills label is automatically created by the one or more processors by transforming information stored in the educational resource data repository into one or more graphical representations thereof, and where information stored in the educational resource data repository is employed to calculate a skill points for each skill and total points for each resource based upon, at least, a skill focus value, completion time, and skill difficulty associated with each educational resource, and the skill points and total points are rendered by the suitable output device, and wherein information stored in the educational resource data repository, and rendered by the suitable output device, further includes a plurality of data fields selected from the group consisting of: resource title, resource provider, resource type, resource description, unique identifier, resource cost, prerequisites, requirements, skill(s) type, skill(s), standard, knowledge gained, and a resource URL;

producing a graphic file via a label output engine, said graphic file, upon rendering by a suitable output device, incorporating data from the educational resource data repository and providing a visual and data representation of the skills label information in the common skills label format, where the visual and data representation of skills labels for different resources contain common elements and wherein said output engine further includes a scannable code in the graphic file to provide a link to the visual and data representation of the skills label information, said skills label including at least one graphical representation for at least one data field selected from the group consisting of: prerequisites, requirements, skills, focus, and level; and interacting with at least one of said educational resource data repository or said user data repository, via at least one user interface operating under the programmatic control of a software application, and creating and editing an educational resource record or a user record, respectively.

13. The method according to claim 12 wherein said at least one user interface, is operable to:

update a user record with information selected from the group consisting of: (i) skills labels associated with the user's record based upon discrete tasks accomplished by the user, and (ii) related personal information for the user; and search and access educational resources within the educational resource data repository based upon specified criteria; and wherein said at least one user interface, is operable to add, edit or delete an educational resource record and information associated therewith.

14. The method according to claim 12 wherein said at least one user interface, is operable by an administrator to search and identify educational resources based on data entered and stored in the educational resource data repository during the creation and verification of an educational resource record;

wherein a search conducted via the user interface returns a collection of educational resource records meeting at least one search criteria, and where the identified education resource records are each represented as icons with associated information from a respective skills label; and wherein associated information from a respective skills label is suitable for the user to make a return-on-investment calculation while comparing the search results, and where the information includes: time taken to consume the resource, how much the resource costs, and total skill, points earned from the resource.

15. The method according to claim 14 wherein a provider creates a ticket for the review and verification of the educational resource as represented by the educational resource record in the educational resource repository, wherein the ticket includes a copy of the educational resource itself and applicable standards.

16. The method according to claim 12 further including at least semi-automatically, operating at least in part under the programmatic control of the software application and capable of interacting with at least one of said educational resource data repository or said user data repository, providing for the review and validation of an educational resource and the generation of the associated skills label.

17. A computer program product embodied on a computer readable storage medium for processing educational resource information stored on a network comprising:

computer code for receiving from a first source a first network educational resource record;

computer code for correlating and validating the first network educational resource record with standards and validation information available from a common source; and computer code for using the educational resource information with which the first educational resource record is correlated and validated to enhance the first educational resource record and to associate at least one skill with the educational resource and produce, with a label output engine operating on at least one of said processors and employing a common label format, to automatically produce a first skills label graphic file associated with the educational resource, where the skills label graphic file includes at least one graphical representation of the at least one skill associated with the educational resource that is gained by the user's consumption of the educational resource, and where said first skills label graphic file further includes a displayable representation of at least a portion of information in the enhanced first educational record enabling easy comparison and contrast of the educational resource.

18. The computer program product according to claim 17, wherein the first source providing the first network educational resource record comprises an interactive interface for a provider to add or edit the educational resource record information, and where the educational resource record is stored within a data repository.

* * * * *